United States Patent
Tillotson et al.

(10) Patent No.: US 10,128,789 B2
(45) Date of Patent: Nov. 13, 2018

(54) PHANTOM ELECTRIC MOTOR SYSTEM WITH PARALLEL COILS

(71) Applicant: The Boeing Company, Chicago, IL (US)

(72) Inventors: Brian J. Tillotson, Kent, WA (US); Peng Zeng, Newcastle, WA (US); Steven Richard Corey, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 825 days.

(21) Appl. No.: 14/511,366

(22) Filed: Oct. 10, 2014

(65) Prior Publication Data

US 2016/0105139 A1 Apr. 14, 2016

(51) Int. Cl.
*H02P 31/00* (2006.01)
*H02P 27/04* (2016.01)
*H02K 3/20* (2006.01)
*H02K 3/47* (2006.01)
*H02K 11/00* (2016.01)
(Continued)

(52) U.S. Cl.
CPC ............... *H02P 31/00* (2013.01); *H02K 3/20* (2013.01); *H02K 3/28* (2013.01); *H02K 3/47* (2013.01); *H02K 11/0094* (2013.01); *H02K 11/35* (2016.01); *H02K 37/02* (2013.01); *H02K 37/08* (2013.01); *H02P 27/00* (2013.01); *H02P 27/04* (2013.01); *H04B 5/00* (2013.01); *H04B 5/0025* (2013.01); *H04B 5/0031* (2013.01);
(Continued)

(58) Field of Classification Search
CPC .......... H02K 3/26; H02K 29/08; H02K 21/24; H02K 2201/18; H02K 41/03; H02K 16/00; H02K 23/54; H02K 24/00; H02K 3/47; H02K 51/00; H02K 53/00; H02K 99/20; H02K 13/04; H02K 2203/03; H02K 2211/03; H02K 11/35; H02K 3/20; H02K 3/28; H02P 31/00; H04B 5/00; H04B 5/0025
USPC ........................................................ 318/503
See application file for complete search history.

(56) References Cited

U.S. PATENT DOCUMENTS 2,834,896 A 5/1958 Fisher
2,847,589 A * 8/1958 Haydon .................. H02K 3/26
310/237
(Continued)

OTHER PUBLICATIONS

European Examination Report, dated Feb. 17, 2017, regarding Application No. 15188500.1, 6 pages.
(Continued)

*Primary Examiner* — Kawing Chan
(74) *Attorney, Agent, or Firm* — Yee & Associates, P.C.

(57) ABSTRACT

A method and apparatus for operating an electric motor is presented. A transmit magnetic field is received at a group of receive coils having a group of axes oriented substantially parallel to magnetic field lines from a transmit coil and having a group of resonant frequencies. A resonant frequency in the group of resonant frequencies is different from other receive coils in the group of receive coils. A receive magnetic field is generated at a receive coil in the group of receive coils having the resonant frequency when the transmit magnetic field has a selected frequency matching the resonant frequency. The receive magnetic field attracts a rotor in the electric motor.

15 Claims, 18 Drawing Sheets

(51) Int. Cl.
- *H04B 5/00* (2006.01)
- *H02K 3/28* (2006.01)
- *H02K 37/02* (2006.01)
- *H02K 37/08* (2006.01)
- *H02K 11/35* (2016.01)
- *H02P 27/00* (2006.01)
- *H02K 19/10* (2006.01)

(52) U.S. Cl.
CPC ......... *H04B 5/0087* (2013.01); *H02K 19/103* (2013.01); *H02P 2201/05* (2013.01)

(56) References Cited

U.S. PATENT DOCUMENTS

| | | | | |
|---|---|---|---|---|
| RE25,305 | E * | 12/1962 | Haydon | H02K 3/26 310/237 |
| 3,643,140 | A * | 2/1972 | Allison | G04C 3/165 318/132 |
| 3,719,845 | A * | 3/1973 | Takeda | H02K 3/26 310/268 |
| 3,737,697 | A * | 6/1973 | Kitamori | H02K 3/26 310/207 |
| 4,223,300 | A * | 9/1980 | Wiklund | G01D 5/208 318/661 |
| 4,305,027 | A * | 12/1981 | Wilson | H02K 13/14 318/492 |
| RE31,278 | E * | 6/1983 | Schmider | H02K 29/08 310/156.34 |
| 4,394,594 | A * | 7/1983 | Schmider | H02K 3/47 310/156.34 |
| 4,421,997 | A * | 12/1983 | Forys | G01C 21/18 310/12.04 |
| 4,455,516 | A * | 6/1984 | Furusho | H02K 29/08 310/156.06 |
| 4,490,637 | A * | 12/1984 | van de Griend | H01R 39/06 310/234 |
| 4,508,998 | A * | 4/1985 | Hahn | H02K 29/06 318/400.41 |
| 4,535,279 | A * | 8/1985 | Arbisi | H02K 29/00 310/49.43 |
| 4,560,893 | A * | 12/1985 | van de Griend | H02K 3/00 310/268 |
| 4,633,149 | A * | 12/1986 | Welterlin | H02K 5/08 310/68 R |
| 4,639,648 | A * | 1/1987 | Sakamoto | H02K 29/08 310/68 R |
| 4,684,855 | A * | 8/1987 | Kallos | H02K 37/14 318/400.26 |
| 4,737,675 | A * | 4/1988 | Maemine | H02K 29/14 310/268 |
| RE32,674 | E * | 5/1988 | Wilson | H02K 13/14 318/400.26 |
| 4,804,574 | A * | 2/1989 | Osawa | H02K 3/26 310/184 |
| 4,922,513 | A * | 5/1990 | Joichi | H02P 6/06 310/DIG. 3 |
| 4,959,573 | A | 9/1990 | Roberts | |
| 5,036,239 | A * | 7/1991 | Yamaguchi | G08B 6/00 310/268 |
| 5,039,895 | A * | 8/1991 | Meister | G04C 13/11 310/184 |
| 5,099,162 | A * | 3/1992 | Sawada | H01F 6/06 310/154.05 |
| 5,124,604 | A * | 6/1992 | Swartz | G11B 19/20 310/268 |
| 5,146,144 | A * | 9/1992 | Lee | H02K 7/20 310/156.34 |
| 5,212,418 | A * | 5/1993 | Mason | H02K 16/02 310/112 |
| 5,214,604 | A * | 5/1993 | Kato | G11C 29/02 365/185.2 |
| 5,216,339 | A * | 6/1993 | Skybyk | H02K 3/46 310/112 |
| 5,227,702 | A * | 7/1993 | Nahirney | H02K 29/06 310/140 |
| 5,229,696 | A * | 7/1993 | Golker | H02K 24/00 310/184 |
| 5,235,258 | A * | 8/1993 | Schuerch | A61G 7/018 318/16 |
| 5,258,697 | A * | 11/1993 | Ford | B60L 11/1807 310/156.12 |
| 5,428,282 | A * | 6/1995 | Johnson | H02K 21/14 318/400.41 |
| 6,127,754 | A * | 10/2000 | Kolomeitsev | H02K 7/14 310/75 R |
| 6,147,421 | A * | 11/2000 | Takita | G03F 7/70758 310/12.24 |
| 6,275,143 | B1 * | 8/2001 | Stobbe | G06K 7/0008 320/108 |
| 6,650,079 | B2 * | 11/2003 | Binnard | H02P 6/006 318/632 |
| 6,803,738 | B2 * | 10/2004 | Erten | H02K 41/031 310/103 |
| 6,891,601 | B2 * | 5/2005 | Jeanne | G03B 27/58 310/12.01 |
| 6,982,530 | B2 * | 1/2006 | Takeuchi | H02K 51/00 310/156.36 |
| 7,011,624 | B2 * | 3/2006 | Forsell | A61F 2/26 600/38 |
| 7,095,155 | B2 * | 8/2006 | Takeuchi | H02P 6/16 310/266 |
| 7,211,974 | B2 * | 5/2007 | Takeuchi | H02P 6/16 318/280 |
| 7,338,437 | B2 * | 3/2008 | Forsell | A61F 2/26 600/38 |
| 7,573,173 | B1 * | 8/2009 | Frownfelter | H02K 3/47 310/208 |
| 7,621,863 | B2 * | 11/2009 | Forsell | A61F 2/0036 600/30 |
| 7,719,147 | B2 * | 5/2010 | Palmer, Jr. | H02K 21/24 310/68 R |
| 7,884,563 | B2 * | 2/2011 | Takeuchi | H02P 6/16 310/156.35 |
| 8,096,939 | B2 * | 1/2012 | Forsell | A61F 2/0036 600/30 |
| 8,115,646 | B2 * | 2/2012 | Tanielian | G01W 1/02 340/632 |
| 8,138,699 | B2 * | 3/2012 | Zhu | H02K 16/00 318/400.01 |
| 8,461,719 | B2 * | 6/2013 | Kesler | B60L 11/007 307/104 |
| 8,482,158 | B2 * | 7/2013 | Kurs | H01Q 1/248 307/104 |
| 8,487,480 | B1 * | 7/2013 | Kesler | B60L 11/007 307/104 |
| 8,604,791 | B2 * | 12/2013 | Vaughan, Jr. | G01R 33/3415 324/318 |
| 8,678,997 | B2 * | 3/2014 | Forsell | A61F 2/26 600/38 |
| 9,806,658 | B2 * | 10/2017 | Zeng | H02P 25/16 |
| 2002/0180395 | A1 * | 12/2002 | Binnard | H02P 6/006 318/649 |
| 2003/0038609 | A1 | 2/2003 | Shien | |
| 2003/0085676 | A1 * | 5/2003 | Binnard | H02K 41/03 318/114 |
| 2003/0100929 | A1 * | 5/2003 | Forsell | A61F 2/26 607/39 |
| 2003/0105385 | A1 * | 6/2003 | Forsell | A61F 2/0036 600/29 |
| 2003/0135089 | A1 * | 7/2003 | Forsell | A61F 5/41 600/38 |
| 2005/0012475 | A1 * | 1/2005 | Takeuchi | H02K 51/00 318/34 |
| 2005/0012920 | A1 * | 1/2005 | Jeanne | G03B 27/58 355/72 |
| 2005/0200213 | A1 * | 9/2005 | Takeuchi | H02P 6/16 310/68 B |

(56) References Cited

U.S. PATENT DOCUMENTS

| | | | | |
|---|---|---|---|---|
| 2005/0225188 A1* | 10/2005 | Griepentrog | ............ | H01F 38/18 310/112 |
| 2007/0015959 A1* | 1/2007 | Forsell | ............ | A61F 2/26 600/38 |
| 2009/0033169 A1* | 2/2009 | Takeuchi | ............ | H02K 7/116 310/156.32 |
| 2009/0066197 A1* | 3/2009 | Chen | ............ | F04D 25/0606 310/68 B |
| 2009/0295318 A1* | 12/2009 | Takeuchi | ............ | H02P 6/16 318/400.04 |
| 2010/0145138 A1* | 6/2010 | Forsell | ............ | A61F 2/0036 600/30 |
| 2010/0145139 A1* | 6/2010 | Forsell | ............ | A61F 2/0036 600/30 |
| 2010/0164296 A1* | 7/2010 | Kurs | ............ | H01Q 1/248 307/104 |
| 2010/0217067 A1* | 8/2010 | Forsell | ............ | A61F 2/0036 600/30 |
| 2011/0031915 A1* | 2/2011 | Seever | ............ | H02P 6/14 318/400.26 |
| 2011/0084637 A1* | 4/2011 | Takeuchi | ............ | H02P 6/16 318/400.26 |
| 2011/0101901 A1* | 5/2011 | Zhu | ............ | H02K 16/00 318/400.14 |
| 2011/0109185 A1* | 5/2011 | Sullivan | ............ | H02K 21/026 310/156.35 |
| 2011/0184230 A1* | 7/2011 | Forsell | ............ | A61F 2/26 600/41 |
| 2011/0227523 A1* | 9/2011 | Grantz | ............ | H02P 25/188 318/724 |
| 2012/0062230 A1* | 3/2012 | Vaughan, Jr. | ............ | G01R 33/3415 324/318 |
| 2012/0133212 A1* | 5/2012 | Kamata | ............ | H02J 5/005 307/104 |
| 2012/0228953 A1* | 9/2012 | Kesler | ............ | H03H 7/40 307/104 |
| 2012/0228954 A1* | 9/2012 | Kesler | ............ | H03H 7/40 307/104 |
| 2012/0235633 A1* | 9/2012 | Kesler | ............ | H03H 7/40 320/108 |
| 2012/0239117 A1* | 9/2012 | Kesler | ............ | H03H 7/40 607/61 |
| 2012/0326541 A1* | 12/2012 | Palmer | ............ | H02K 3/04 310/83 |
| 2013/0147418 A1* | 6/2013 | Palmer | ............ | H02K 21/24 318/722 |
| 2013/0219416 A1* | 8/2013 | Yoshiya | ............ | H02P 5/60 720/601 |
| 2013/0271135 A1* | 10/2013 | Ozen | ............ | G01R 33/543 324/309 |
| 2013/0342054 A1* | 12/2013 | Long | ............ | H02K 21/24 310/71 |
| 2014/0097846 A1* | 4/2014 | Lemaire | ............ | G01R 33/3415 324/322 |
| 2014/0159646 A1* | 6/2014 | Sankar | ............ | H02J 17/00 320/107 |
| 2014/0197833 A1* | 7/2014 | Ryu | ............ | G01R 33/288 324/309 |
| 2014/0225434 A1* | 8/2014 | Niizuma | ............ | B60L 11/182 307/10.1 |
| 2014/0252913 A1* | 9/2014 | Fahimi | ............ | H02P 6/00 310/216.075 |
| 2014/0257614 A1* | 9/2014 | Niizuma | ............ | B60L 11/182 701/22 |
| 2014/0296627 A1* | 10/2014 | Forsell | ............ | A61F 2/26 600/40 |
| 2015/0048689 A1* | 2/2015 | Ookawa | ............ | H02J 5/005 307/104 |
| 2015/0256115 A1* | 9/2015 | Zeng | ............ | H02P 25/16 318/16 |
| 2016/0134126 A1* | 5/2016 | Tillotson | ............ | H01F 38/14 307/104 |
| 2017/0133957 A1* | 5/2017 | Tillotson | ............ | H02P 6/15 |

OTHER PUBLICATIONS

Cameron, Jr., "Current Control in Brushless DC Motors," U.S. Appl. No. 13/303,673, filed Nov. 23, 2011, 43 pages.

Zeng et al., "Active Voltage Controller for an Electric Motor," U.S. Appl. No. 13/905,392, filed May 30, 2013, 47 pages.

Zeng, "Remote Wireless Motor Control Law Processing System," U.S. Appl. No. 13/891,456, filed May 10, 2013, 37 pages.

Cameron et al., "Reluctance Motor System," U.S. Appl. No. 14/043,612, filed Oct. 1, 2013, 78 pages.

Zeng et al., "Wirelessly Powered Electric Motor," U.S. Appl. No. 14/199,272, filed Mar. 6, 2014, 49 pages.

Extended European Search Report, dated Jun. 8, 2016, regarding application 15188500.1, 8 pages.

* cited by examiner

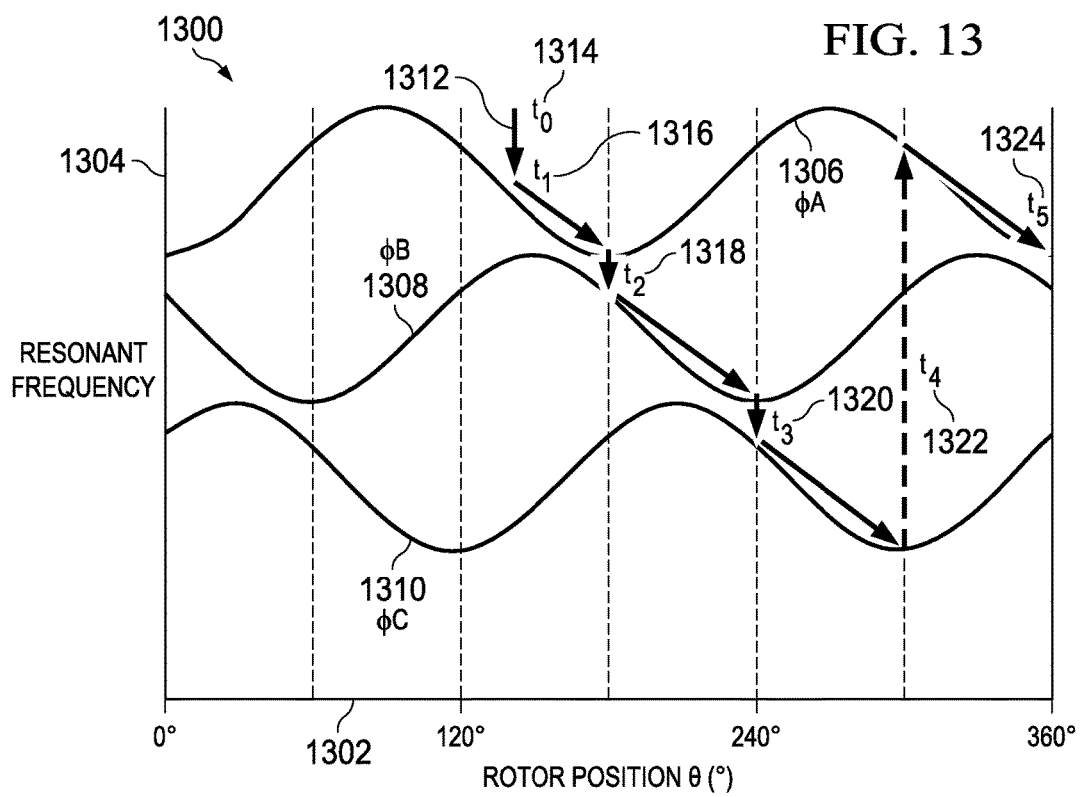
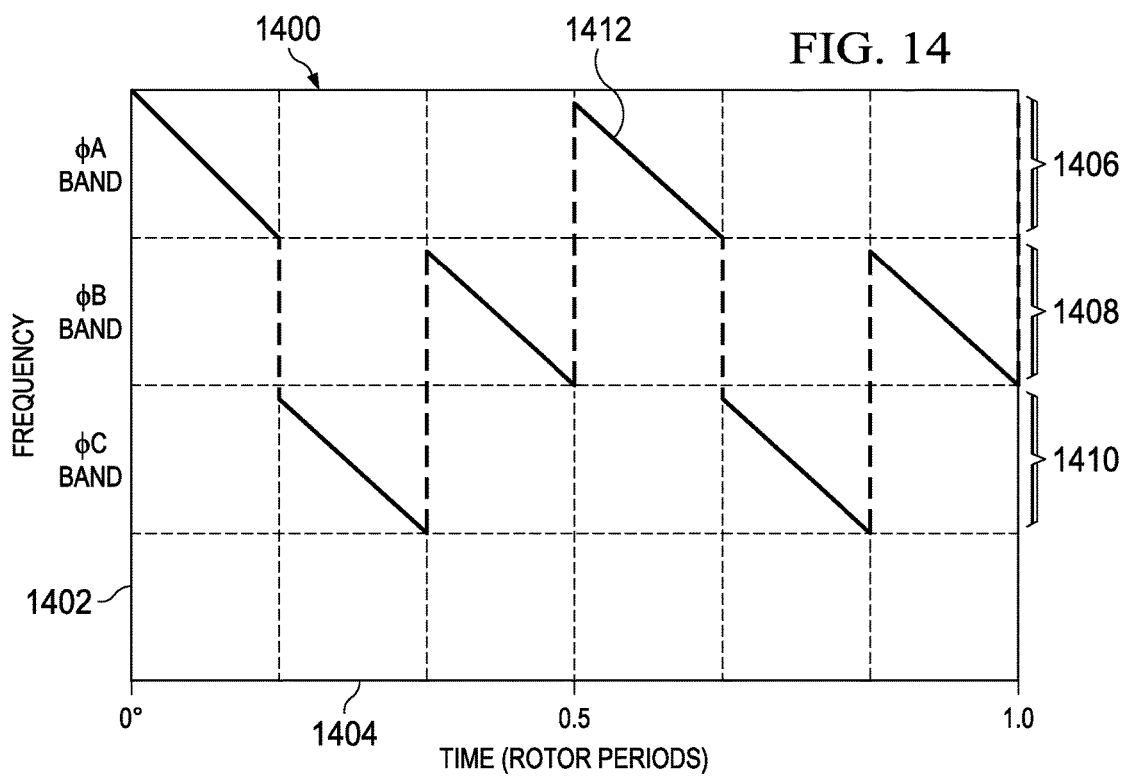

PHANTOM ELECTRIC MOTOR SYSTEM WITH PARALLEL COILS

BACKGROUND INFORMATION

1. Field

The present disclosure relates generally to electric motor systems and, in particular, to brushless electric motors. Still more particularly, the present disclosure relates to a method and apparatus for a phantom motor with parallel coils.

2. Background

An electric motor is a device that converts electrical power into mechanical power. Electric motors may be used for various applications. For example, without limitation, electric motors may be used to drive fans, pumps, tools, disk drives, drills, and other types of devices. Electric motors may be used in various environments. For example, electric motors may be used for applications on various fixed and mobile platforms, such as aircraft and other vehicles.

Electric motors may be used on aircraft to perform various functions on the aircraft. For example, without limitation, electric motors on an aircraft may be used to move flight control surfaces, to raise and lower landing gear, and to perform other functions on the aircraft. One general problem with electric motors is the size, cost, and weight of electric motors. Reducing these factors is desirable.

One type of electric motor is a phantom motor. A phantom motor is a type of brushless motor. The transmitter for a phantom motor produces a magnetic field that has a frequency that oscillates. This magnetic field powers and controls the motor. The magnetic field powers the phantom motor through resonant inductive coupling that occurs directly with each coil in the phantom motor.

The components for a phantom motor, the transmitter, or both in the phantom motor system are often more costly than desired. The cost is partially based on the part count and the cost of assembly. The assembly includes, for example, winding coils and stacking laminates.

Further, the weight of a phantom motor system is often heavier than desired. Magnetic iron cores and copper windings add to the weight of the phantom motor system. These components in the phantom motor system also may result in a size that is larger or bulkier than desired. As a result, the applications in which a phantom motor system may be used may be limited based on one or more of the size, cost, and weight of the phantom motor system.

Therefore, it would be desirable to have a method and apparatus that take into account at least some of the issues discussed above, as well as other possible issues. For example, it would be desirable to have a phantom motor system that is lower in at least one of cost or weight as compared to currently available phantom motor systems.

SUMMARY

In one illustrative embodiment, an apparatus comprises a rotor comprised of a magnetic material and a group of receive coils. The group of receive coils has a group of axes oriented substantially parallel to magnetic field lines from a transmit coil and has a group of resonant frequencies. A receive coil in the group of receive coils has a resonant frequency in the group of resonant frequencies that is different from other receive coils in the group of receive coils such that the receive coil generates a receive magnetic field that attracts the rotor when a transmit magnetic field has a selected frequency relative to the resonant frequency for the receive coil.

In another illustrative embodiment, a method for operating an electric motor is presented. A transmit magnetic field is received at a group of receive coils having a group of axes oriented substantially parallel to magnetic field lines from a transmit coil and having a group of resonant frequencies. A resonant frequency in the group of resonant frequencies is different from other receive coils in the group of receive coils. A receive magnetic field is generated at a receive coil in the group of receive coils having the resonant frequency when the transmit magnetic field has a selected frequency matching the resonant frequency. The receive magnetic field attracts a rotor in the electric motor.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of a graph showing resonant frequencies for receive coils in accordance with an illustrative embodiment;

FIG. 14 is an illustration of a graph showing transmission frequency versus time for a transmit magnetic field in accordance with an illustrative embodiment;

DETAILED DESCRIPTION

The illustrative embodiments recognize and take into account one or more different considerations. For example, the illustrative embodiments recognize and take into account that one manner in which at least one of the cost, weight, or size of a phantom motor system is reduced is to design the phantom motor system in a manner that reduces the number of coils. For example, the illustrative embodiments recognize and take into account that one manner in which these parameters may be reduced is to use a phantom motor system that reduces the number of transmit coils needed to align the external field generated by the transmit coils with the receiving coils on a stator in the motor portion of the phantom motor system. Currently used phantom motor systems have three transmit coils.

Thus, the illustrative embodiments provide a method and apparatus for a motor system. In one illustrative example, an apparatus comprises a transmitter and a wireless electric motor. In particular, the wireless electric motor may be a phantom motor.

For example, one manner in which the number of transmit coils may be reduced is through selecting orientation of the receive coils for the stators on the motor. For example, the receive coils may be arranged radially from the axis of rotation of the rotor. In other words, a coil may be positioned such that an axis extending through the coil is substantially perpendicular to the rotor axis for the rotor. The illustrative embodiments recognize and take into account that with this type of orientation of the receive coils, a single transmit coil may be used. The transmit coil may have an orientation that is parallel to the axis of rotation.

In another illustrative example, the electric motor may have a rotor and a group of receive coils. The rotor rotates about a rotor axis, and the rotor is comprised of a magnetic material. The group of receive coils have a group of axes oriented substantially parallel to the rotor axis. The receive coils have a group of resonant frequencies for the group of coils. In the illustrative example, a coil in the group of coils has a different resonant frequency from other coils in the group of coils such that the coil generates a receive magnetic field that attracts the rotor when a transmit magnetic field has a selected frequency relative to the resonant frequency for the coil. As used herein, a "group of" when used with reference to items means one or more items. For example, a group of receive coils is one or more receive coils.

In the illustrative examples, the different orientations of the receive coils relative to the transmit coil are selected such that the axes of the receive coils are oriented substantially parallel to the magnetic field lines in the transmit magnetic field generated by the transmit coil. In this manner, the orientation of the receive coils may be selected to increase the efficiency of electric motors that receive power wirelessly from the transmit coil.

Figure 1:
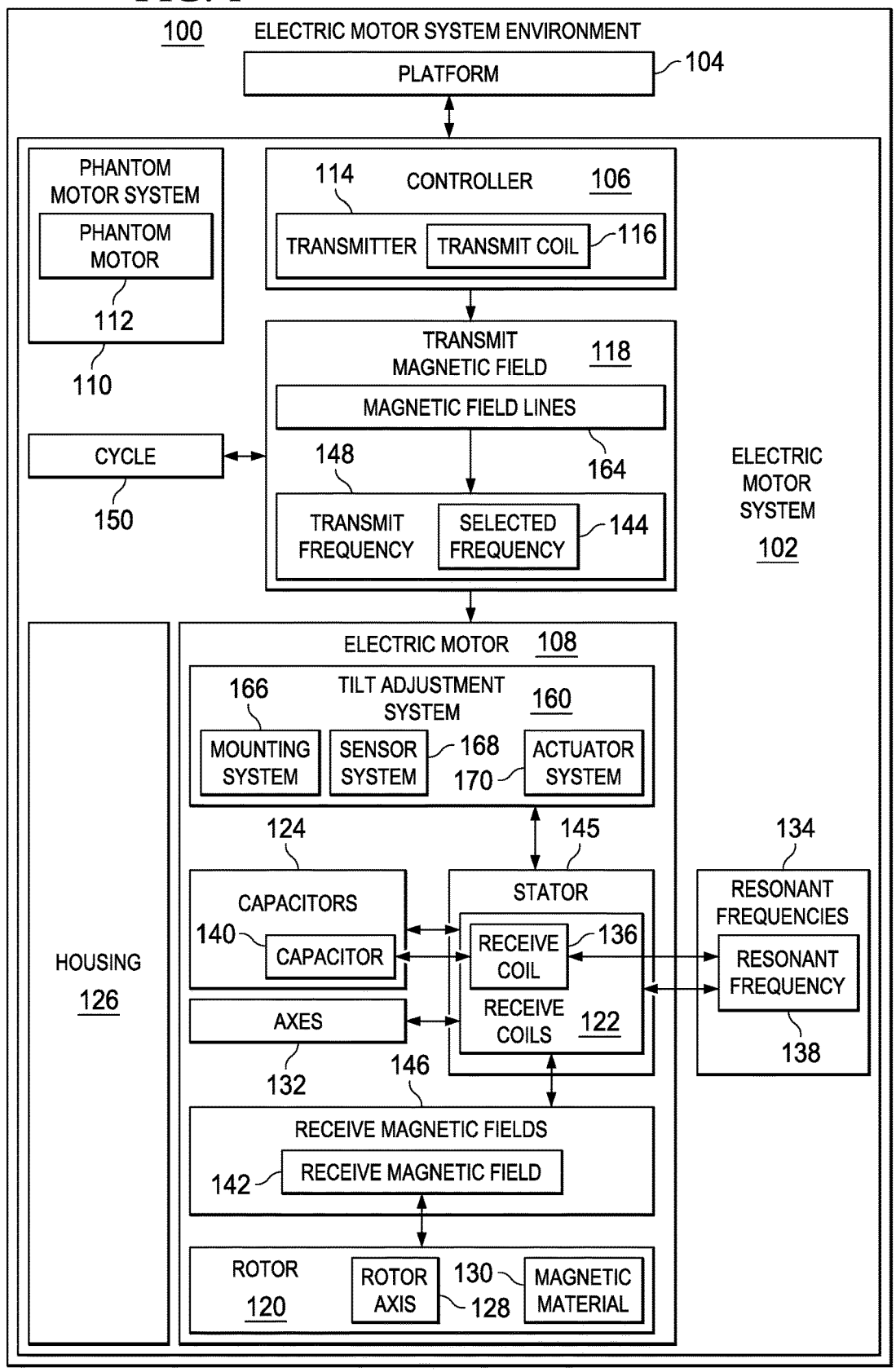
FIG. 1 is an illustration of a block diagram of an electric motor system environment in accordance with an illustrative embodiment.

With reference to the figures and, in particular, with reference to FIG. 1, an illustration of a block diagram of an electric motor system environment is depicted in accordance with an illustrative embodiment. In this illustrative example, electric motor system environment 100 includes electric motor system 102.

Electric motor system 102 may be associated with platform 104. When one component is "associated" with another component, the association is a physical association in the depicted examples. For example, a first component may be considered to be physically associated with a second component by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

In this illustrative example, platform 104 may take various forms. For example, platform 104 may be selected from one of a mobile platform, a stationary platform, a land-based structure, an aquatic-based structure, and a space-based structure. More specifically, the platform may be an aircraft, an unmanned aerial vehicle, an unmanned ground vehicle, a surface ship, a tank, a personnel carrier, a train, a spacecraft, a space station, a satellite, a submarine, an automobile, a power plant, a bridge, a dam, a house, a manufacturing facility, a building, an artificial limb, an artificial organ, an implantable drug pump, a biomedical implant, a robotic arm, a nano robot, and other suitable platforms.

As depicted, electric motor system 102 includes controller 106 and electric motor 108. In the illustrative example, electric motor system 102 may be phantom motor system 110 in which electric motor 108 is phantom motor 112. As depicted, when electric motor 108 takes the form of phantom motor 112, power is sent wirelessly to phantom motor 112. In other words, phantom motor 112 does not have a power cable or wire to supply power to operate phantom motor 112.

In the illustrative example, controller 106 includes transmitter 114. As depicted, transmitter 114 controls the operation of electric motor 108. For example, transmitter 114 includes transmit coil 116 that supplies power in the form of transmit magnetic field 118.

As depicted, electric motor 108 is comprised of a number of different components. In the illustrative example, electric motor 108 includes rotor 120, a group of receive coils 122, a group of capacitors 124, and housing 126.

Rotor 120 rotates about rotor axis 128. Rotor 120 is comprised of magnetic material 130. Magnetic material 130 may be any material that produces a magnetic field in the illustrative example. The magnetic field generated by magnetic material 130 occurs in response to an externally applied magnetic field.

In the illustrative example, the group of receive coils 122 has a group of axes 132. As depicted, group of axes 132 is oriented substantially parallel to rotor axis 128. The group of receive coils 122 has a group of resonant frequencies 134.

As depicted, the group of capacitors 124 is electrically connected to the group of receive coils 122. The group of capacitors 124 sets the group of resonant frequencies 134 for the group of receive coils 122 when the group of capacitors 124 are connected to the group of receive coils 122. In the illustrative examples, when a receive coil is described as having a resonant frequency, that description means that the receive coil and the capacitor connected to the receive coil form a circuit that has the resonant frequency.

The group of capacitors 124 may have different values such that the group of receive coils 122 has different values for the group of resonant frequencies 134. For example, receive coil 136 in the group of receive coils 122 has resonant frequency 138 in the group of resonant frequencies 134 that is different from other receive coils in the group of receive coils 122. In other words, receive coil 136 with capacitor 140 form a circuit that has resonant frequency 138.

In one illustrative example, each of the group of resonant frequencies 134 is unique. In other words, none of the group of resonant frequencies 134 has the same value as others in the group of resonant frequencies 134.

As depicted, receive coil 136 in the group of receive coils 122 is electrically connected to capacitor 140 in the group of capacitors 124. Receive coil 136 and capacitor 140 form an inductive circuit such that receive coil 136 has resonant frequency 138 in this illustrative example. The inductive circuit is an LC circuit. In the illustrative example, resonant frequency 138 is a frequency in which the impedance around the LC circuit formed by receive coil 136 and capacitor 140 is about zero.

In this illustrative example, receive coil 136 generates receive magnetic field 142 that attracts rotor 120 when transmit magnetic field 118 has selected frequency 144 relative to resonant frequency 138 for receive coil 136. In other words, receive magnetic field 142 attracts a portion of rotor 120 causing rotor 120 to rotate such that that portion of rotor 120 moves towards receive coil 136.

Transmit magnetic field 118 with selected frequency 144 may have a magnitude that causes the generation of receive magnetic field 142. In particular, selected frequency 144 of transmit magnetic field 118 may be resonant frequency 138 that causes the generation of receive magnetic field 142 in receive coil 136. Selected frequency 144 may have the same value as resonant frequency 138.

In the illustrative example, resonant frequency 138 is a frequency at which receive magnetic field 142 generated by receive coil 136 is sufficient to attract rotor 120 in this illustrative example. In the illustrative example, this attraction may mean rotor 120 moves towards receive coil 136. In other words, receive coil 136 is fixed and does not turn, while rotor 120 rotates. In other words, rotor 120 is rotatable about rotor axis 128 and the group of receive coils 122 have a fixed position. In this depicted example, the group of receive coils 122 are part of stator 145 in electric motor 108. Transmit magnetic field 118 with selected frequency 144 may have a magnitude that causes the generation of receive magnetic field 142. In particular, selected frequency 144 of transmit magnetic field 118 may be resonant frequency 138 that causes the generation of receive magnetic field 142 in receive coil 136.

In this manner, different ones of receive coils 122 may be activated to generate the group of receive magnetic fields 146, including receive magnetic field 142. The generation of the group of receive magnetic fields 146 may be such that rotor 120 moves in a desired direction with a desired speed. The generation of the group of receive magnetic fields 146 also may result in rotor 120 having a desired torque.

In one illustrative example, more than one receive coil in the group of receive coils 122 may be activated at the same time to generate receive magnetic fields 146 at the same time. When more than one of receive coils 122 generates receive magnetic fields 146 at the same time, receive magnetic fields 146 at these frequencies may have different magnitudes.

In this illustrative example, transmit frequency 148 for transmit magnetic field 118 may change such that all of group of receive coils 122 becomes activated and generates the group of receive magnetic fields 146. Changing transmit frequency 148 over time such that transmit frequency 148 equals all of resonant frequencies in the group of resonant frequencies 134 occurs over cycle 150. In particular, cycle 150 is the time period over which transmit frequency 148 changes to activate the group of receive coils 122 to generate the group of receive magnetic fields 146.

As depicted, housing 126 is a structure that holds components in electric motor 108. In the illustrative example, at least one of rotor 120, the group of receive coils 122, or the group of capacitors 124 are located inside of housing 126. Transmitter 114 is located outside of housing 126 in this illustrative example.

Additionally, electric motor system 102 may include tilt adjustment system 160. Tilt adjustment system 160 is a device that changes the orientation of the group of receive coils 122. In this manner, the orientation of the group of axes 132 may be changed. This change in the orientation of the group of axes 132 may be based on an amount of divergence of the group of axes 132 from magnetic field lines 164 in transmit magnetic field 118. Alignment of the group of axes 132 may be performed during operation of electric motor 108, before operation of electric motor 108, after operation of electric motor 108, or some combination thereof. The change in orientation may be made to obtain a desired level of performance for electric motor 108 in response to changes in operating conditions.

In this illustrative example, tilt adjustment system 160 may include mounting system 166 to which the group of receive coils 122 are movably connected. Additionally, when tilt adjustment system 160 actively changes the orientation of the group of receive coils 122, tilt adjustment system 160 also may include sensor system 168 to detect the alignment of magnetic field lines 164 in transmit magnetic field 118 with the group of axes 132 for the group of receive coils 122. Additionally, tilt adjustment system 160 also may include actuator system 170 to change the orientation of the group of receive coils 122 to cause the group of axes 132 to change the orientation.

If the adjustment in the orientation of the group of axes 132 is performed passively, then sensor system 168 and actuator system 170 are not needed in electric motor 108. Instead, the group of receive coils 122 may change their orientation by moving on mounting system 166 in response to transmit magnetic field 118 interacting with the group of receive coils 122.

The illustration of electric motor system environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 106 contains transmitter 114. Although not shown, controller 106 also may include a power source that generates power for transmitter 114. Controller 106 also may include other transmitters in addition to or in place of transmitter 114. As another example, one or more electric motors may be used in electric motor system 102 in addition to or in place of electric motor 108. In another illustrative example, the attraction of rotor 120 may mean receive coil 136 moves towards rotor 120 instead of rotor 120 rotating. In other words, receive coil 136 may rotate about rotor axis 128 while rotor 120 is fixed and does not turn in some illustrative examples.

Figure 2:
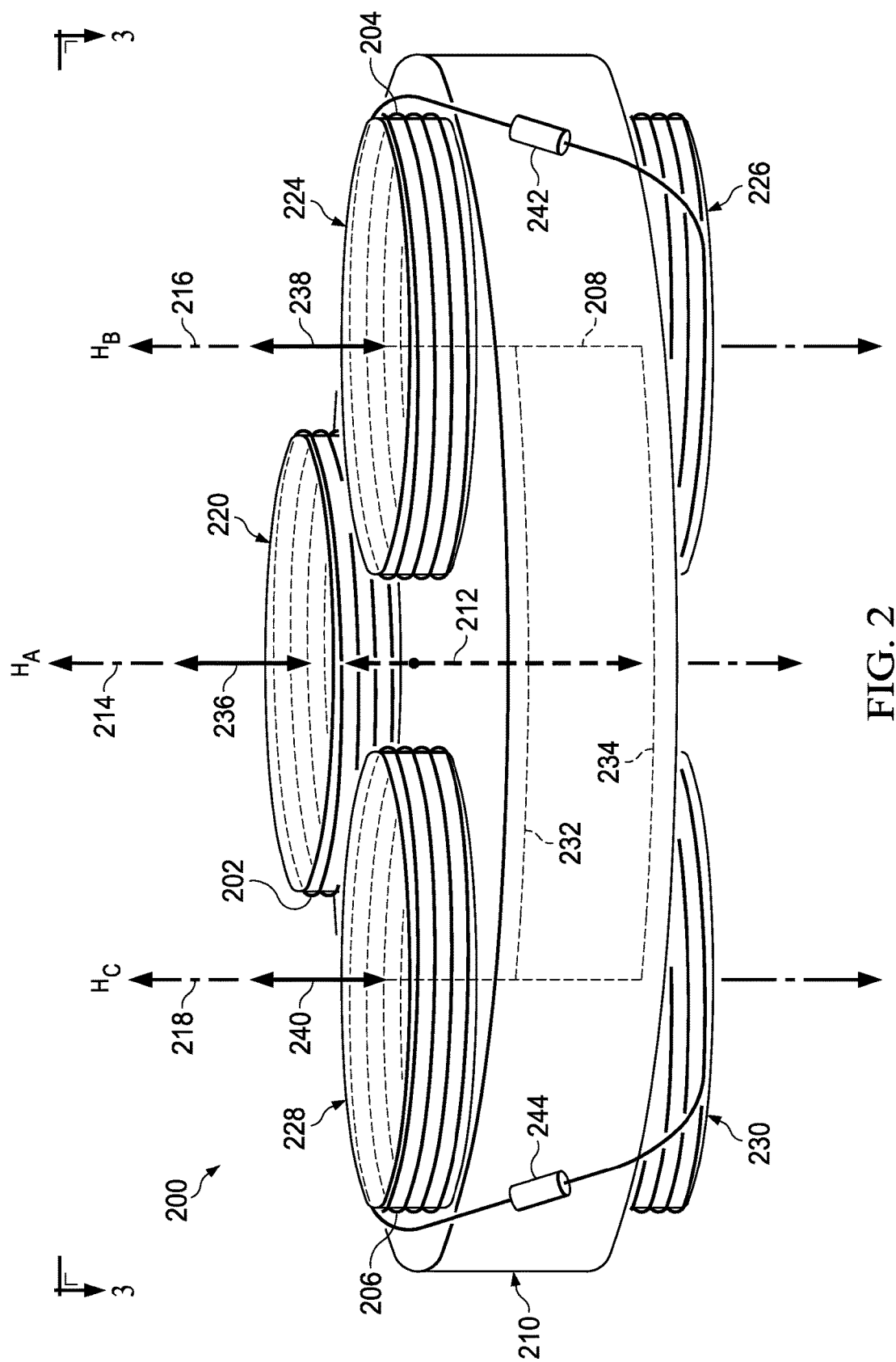
FIG. 2 is an illustration of a phantom motor in accordance with an illustrative embodiment.

With reference now for FIG. 2, an illustration of a phantom motor is depicted in accordance with an illustrative embodiment. In this depicted example, phantom motor 200 is shown in an isometric view. Phantom motor 200 is an example of an implementation for phantom motor 112 shown in block form in FIG. 1.

As depicted, phantom motor 200 has three receive coils: receive coil A 202, receive coil B 204, and receive coil C 206. In this illustrative example, rotor 208 is located inside housing 210. Rotor 208 is shown in phantom in this illustrative example.

Housing 210 may be comprised of a nonconductive material. The use of a nonconductive material for housing 210 may reduce any currents that may reduce or prevent oscillating magnetic fields from reaching receive coil A 202, receive coil B 204, and receive coil C 206.

In the illustrative example, rotor 208 rotates about rotor axis 212. As depicted, receive coil A 202 has axis 214; receive coil B 204 has axis 216; and receive coil C 206 has axis 218. The axes for the receive coils extend centrally through respective receive coils. In this illustrative example, each receive coil has a wire or metal line that is wound to form a cylinder with the axis extending centrally through the cylinder in this depicted example. In other illustrative examples, a coil may have other shapes other than a cylinder.

Axis 214, axis 216, and axis 218 are oriented substantially parallel to rotor axis 212. Further, axis 214, axis 216, and axis 218 are oriented to be substantially parallel to each other.

Also, in this illustrative example, each receive coil has two portions. As depicted, receive coil A 202 has first portion 220 and a second portion (not shown); receive coil B 204 has first portion 224 and second portion 226; and receive coil C 206 has first portion 228 and second portion 230.

As depicted, first portion 220 of receive coil A 202, first portion 224 of receive coil B 204, and first portion 228 of receive coil C 206 are located on first side 232 of rotor 208. The second portion (not shown) of receive coil A 202, second portion 226 of receive coil B 204, and second portion 230 of receive coil C 206 are located on second side 234 of rotor 208.

More specifically, first portion 220 of receive coil A 202, first portion 224 of receive coil B 204, and first portion 228 of receive coil C 206 are located on a first side of the volume defined by housing 210 that contains rotor 208. In a similar fashion, the second portion (not shown) of receive coil A 202, second portion 226 of receive coil B 204, and second portion 230 of receive coil C 206 are located on a second side of the volume defined by housing 210. In this manner, the first and second portions of the receive coils are located opposite to each other but aligned with the axes extending through the receive coils.

In the illustrative example, capacitors are connected to the receive coils. As depicted, receive coil A 202 has capacitor A (not shown); receive coil B 204 has capacitor B 242, and receive coil C 206 has capacitor C 244. These capacitors set the resonant frequency for each of the coils. As depicted, the capacitors have different values such that each coil has a different value for the resonant frequency from the values of the resonant frequencies for other coils in the depicted example.

In this illustrative example, these receive coils are energized by parallel magnetic field vectors: magnetic field vector 236 for receive coil A 202, magnetic field vector 238 for receive coil B 204, and magnetic field vector 240 for receive coil C 206. These magnetic field vectors are generated by a transmit coil (not shown) and cause the corresponding receive coils to generate magnetic fields. In this manner, phantom motor 200 is powered wirelessly.

Figure 3:
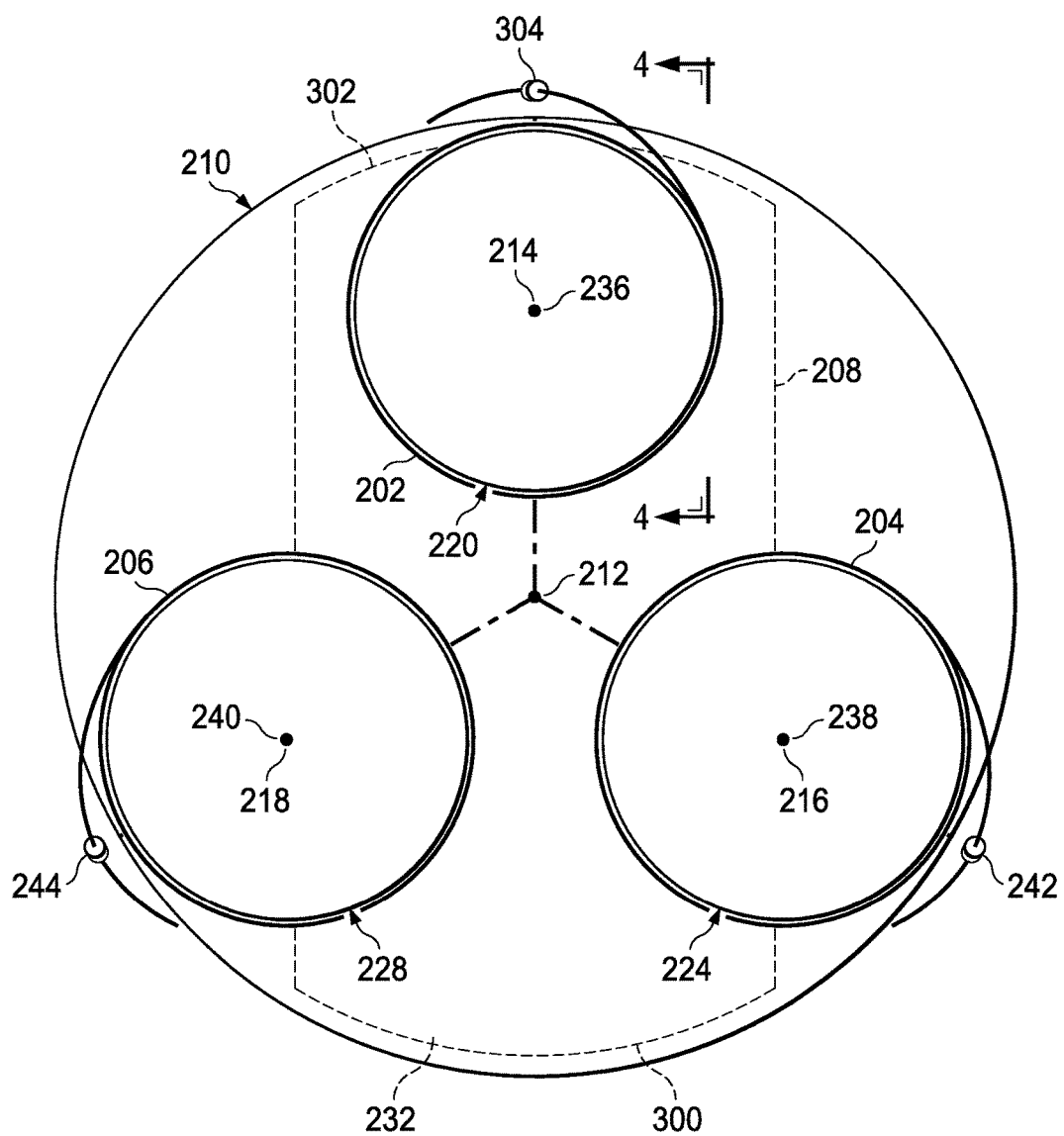
FIG. 3 is an illustration of a top view of a phantom motor in accordance with an illustrative embodiment.

With reference next to FIG. 3, an illustration of a top view of a phantom motor is depicted in accordance with an illustrative embodiment. In this figure, a top view of phantom motor 200 is shown in a view in the direction of 3-3 in FIG. 2.

In this view, rotor 208 is depicted as a two ended rotor having an elongate shape with first end 300 and second end 302. Also seen in this view is capacitor A 304 connected to receive coil A 202.

Figure 4:
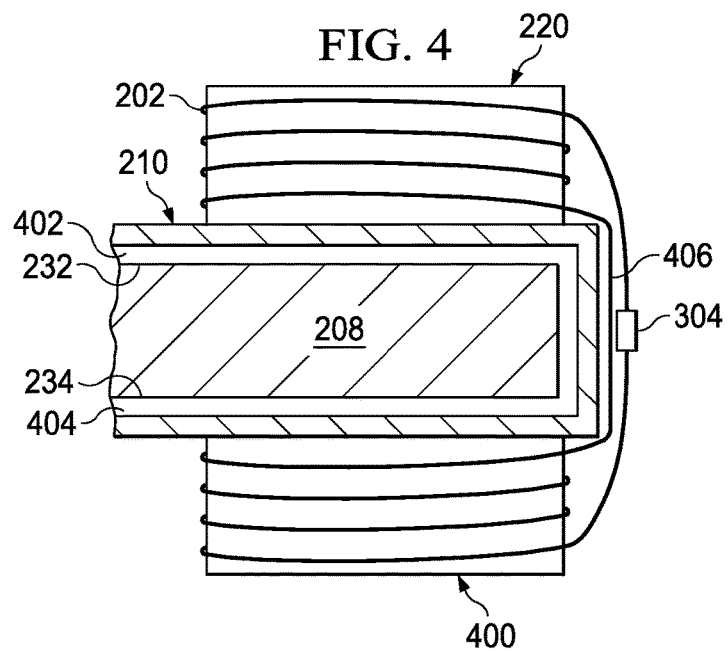
FIG. 4 is an illustration of a cross-sectional view of a portion of a phantom motor in accordance with an illustrative embodiment.

With reference next to FIG. 4, an illustration of a cross-sectional view of a portion of a phantom motor is depicted in accordance with an illustrative embodiment. In this depicted example, a cross-sectional view of a portion of phantom motor 200 is seen taken along lines 4-4 in FIG. 3.

In this view, second portion 400 of receive coil A 202 is shown. First portion 220 is positioned with respect to rotor 208 such that air gap 402 is present. Second portion 400 of receive coil A 202 is positioned with respect to rotor 208 such that air gap 404 is present. Air gap 402 and air gap 404 are part of a volume defined by housing 210. In other words, receive coil A 202 does not touch rotor 208 in the illustrative example. Air gap 402 and air gap 404 may be made as small as possible in the illustrative example.

Also, first portion 220 is connected to second portion 400 by wire 406. The circuit is completed by the connection of first portion 220 to second portion 400 through capacitor A 304. As depicted, capacitor A 304 is connected in series with first portion 220 and second portion 400 of receive coil A 202. First portion 220 may have the same number of windings or a different number of windings than second portion 400 depending on the particular implementation.

When receive coil A 202 is energized, receive coil A 202 generates a magnetic field that attracts rotor 208 into the volume between air gap 402 and air gap 404 located between first portion 220 and second portion 400 of receive coil A 202. This volume may be referred to as a rotor volume. As depicted, the energization of receive coil A 202 is caused by a magnetic field from a transmit coil in a transmitter (not shown).

Figure 5:
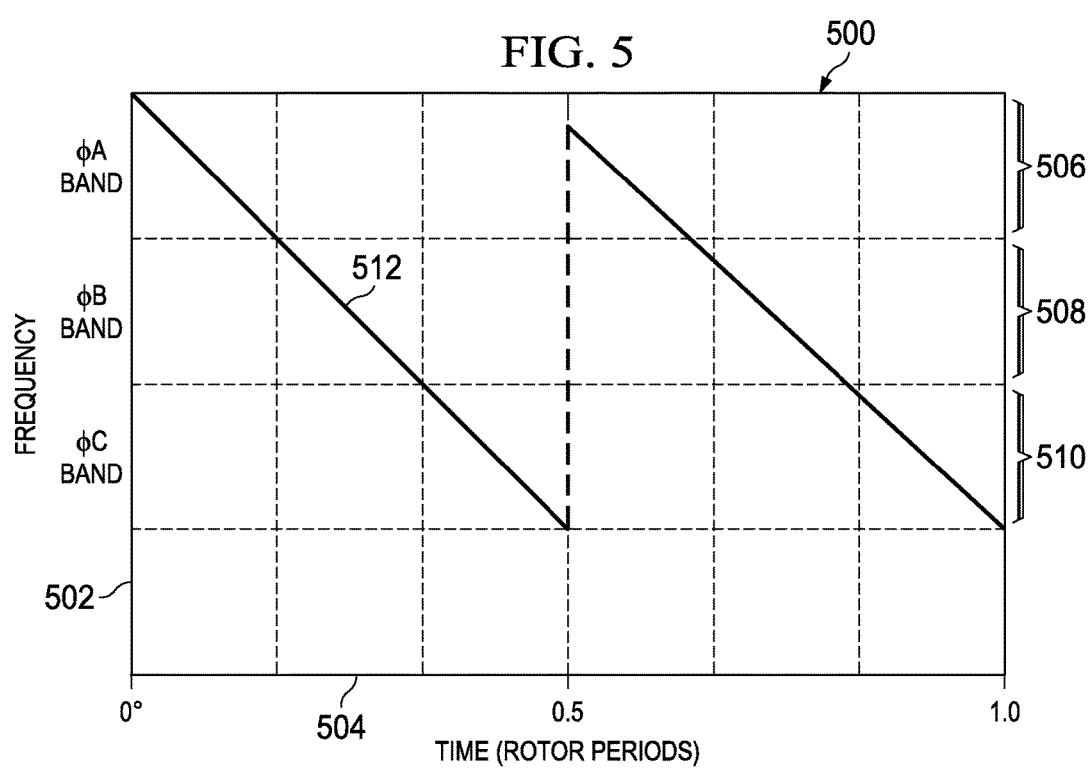
FIG. 5 is an illustration of graph showing transmission frequency versus time for a transmit magnetic field in accordance with an illustrative embodiment.

With reference next to FIG. 5, an illustration of graph showing transmission frequency versus time for a transmit magnetic field is depicted in accordance with an illustrative embodiment. As depicted, graph 500 shows transmission frequencies for transmit magnetic field generated by a transmit coil such as transmit magnetic field 118 generated by transmit coil 116 shown in block form in FIG. 1.

In this illustrative example, graph 500 illustrates transmit frequency on y-axis 502 and time on x-axis 504. The transmit frequency on y-axis 502 shows the frequencies that cause receive coil A 202, receive coil B 204, and receive coil C 206 in FIG. 2 to generate magnetic fields. The time on x-axis 504 shows periods for the turning of a rotor. In this illustrative example, each unit of one on x-axis 504 represents the time for one rotation of the rotor, which is two cycles through the range of frequencies.

As depicted, ΦA band 506 is a range of frequencies at which receive coil A 202 becomes energized and generates a magnetic field. ΦB band 508 is a range of frequencies at which receive coil B 204 becomes energized and generates a magnetic field, and ΦC band 510 is a range of frequencies at which receive coil C 206 becomes energized and generates a magnetic field.

In the illustrative example, the resonant frequency of the transmit magnetic field changes as rotor 208, shown in FIGS. 2-4, turns. This change causes rotor 208 to rotate, which is also referred to as commutation.

Even though the magnetic field generated by a transmit coil is parallel to all three axes for the coils, only the receive coil having a selected frequency within the frequency band for that receive coil generates a magnetic field. The magnetic field generated by the receive coil increases as the frequency transmit magnetic field approaches a resonant frequency for the receive coil and decreases as the frequency moves away from the resonant frequency for the receive coil.

In this example, line 512 shows frequencies of the magnetic field generated by a transmit coil for a rotation of rotor 208 having a sequence of ABC phase order. In this depicted example, A represents receive coil A 202, B represents receive coil B 204, and C represents receive coil C 206.

This pattern of transmission by the transmit coil may be repeated to cause rotor 208 to move in the direction of CBA. This movement may occur with an angular frequency that is one half as fast as the sequence in which receive coils are magnetized to generate magnetic fields. For example, when the receive coils are magnetized in a sequence of ABCABC, the ends of rotor 208 align with the receive coils as follows: first end 300 aligned with A, second end 302 aligned with B, first end 300 aligned with C, second end 302 aligned with A, first end 300 aligned with B, and second end 302 aligned with C. This sequence completes one rotation of rotor 208. In this example, first end 300 of rotor 208 follows the sequence ACB, which is the opposite direction of the sequence in which the coils are magnetized in this example.

Figure 6:
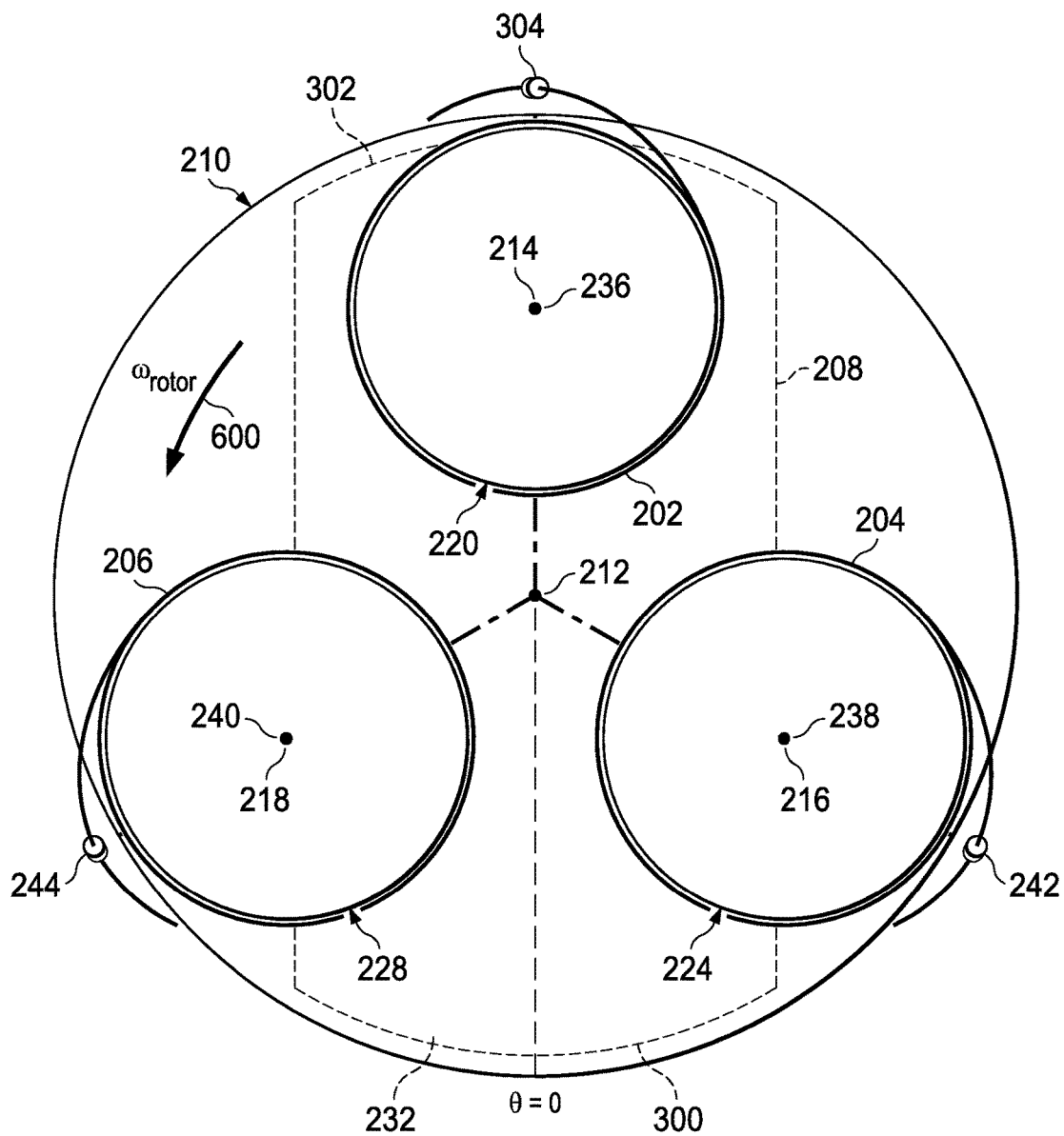
FIGS. 6-8 are illustrations of positions of a rotor in the phantom motor in accordance with an illustrative embodiment.
Figure 7:
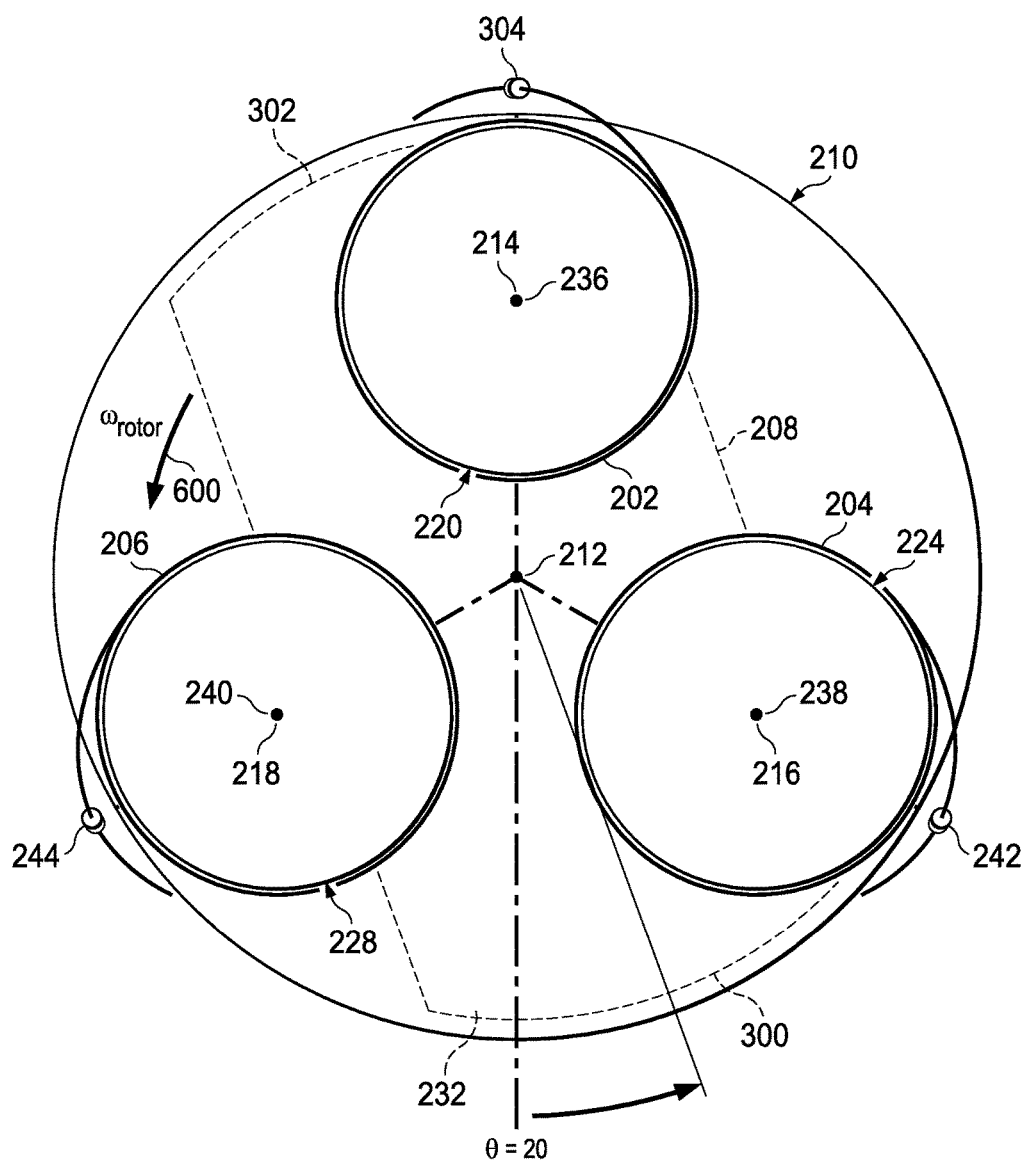
Figure 8:
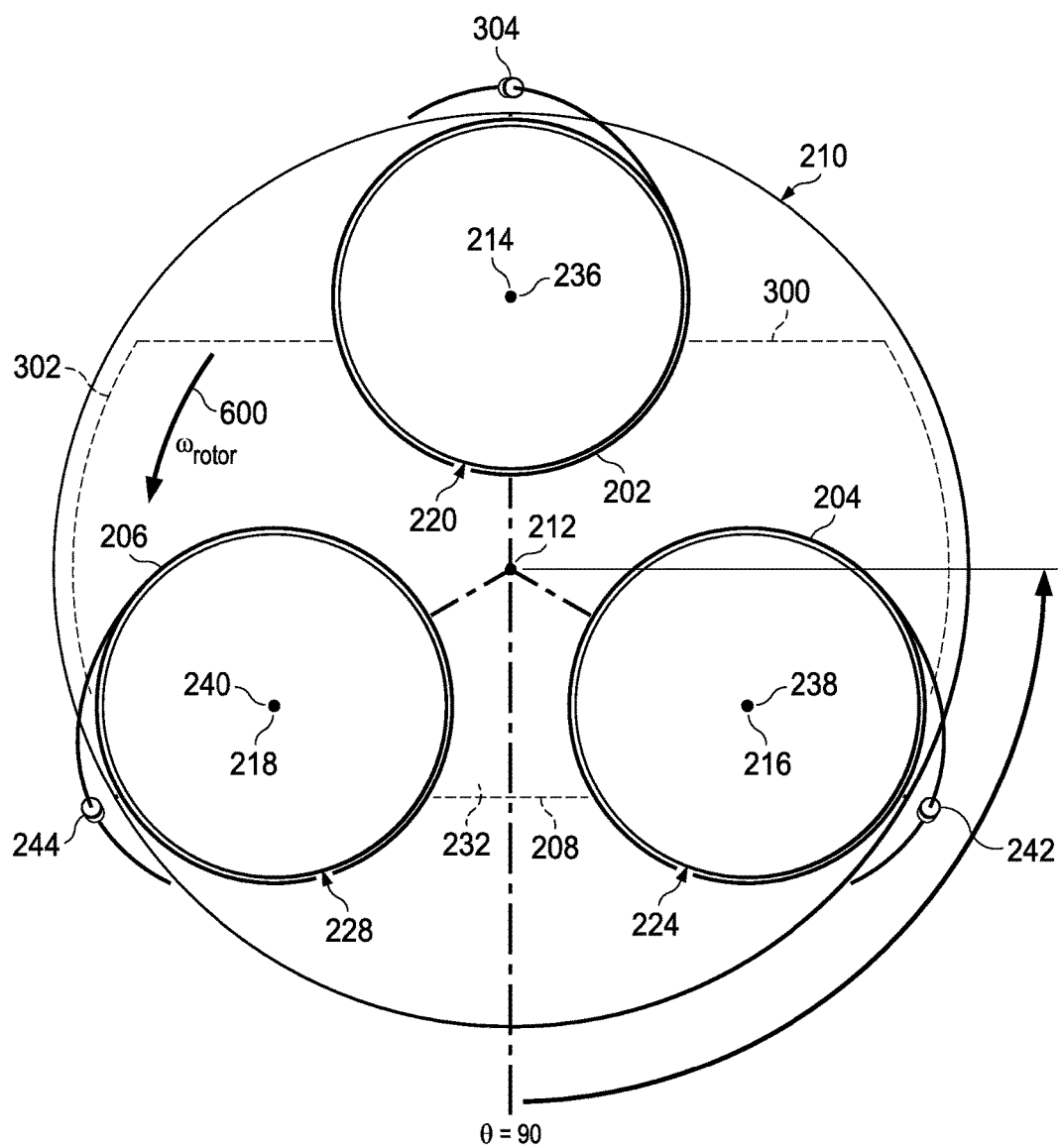

Turning next to FIGS. 6-8, illustrations of positions of a rotor in the phantom motor are depicted in accordance with an illustrative embodiment. In FIG. 6, a beginning position for a rotor is depicted in accordance with an illustrative embodiment. In FIG. 6, rotor 208 is shown in a beginning position before coils are activated to generate magnetic fields.

In the illustrative example, θ is the position of rotor 208. In an initial position, θ equals 0 degrees and second end 302 of rotor 208 is directly aligned with receive coil A 202. As depicted, rotor 208 rotates in the direction of arrow 600. As depicted, arrow 600 represents the angular velocity ($\omega_{rotor}$) for motion of rotor 208. This velocity may be expressed in radians per second.

Next in FIG. 7, another position of a rotor in the phantom motor is depicted in accordance with an illustrative embodiment. In this figure, rotor 208 has moved further in the direction of arrow 600 to a position where θ equals 20 degrees. Second end 302 has moved away from receive coil A 202.

In FIG. 8, another position of a rotor in the phantom motor is depicted in accordance with an illustrative embodiment. As depicted, rotor 208 has moved still further in the direction of arrow 600 to a position where θ equals 90 degrees. In this position, second end 302 has moved 90 degrees which is a quarter turn away from receive coil A 202. With this quarter revolution of rotor 208, rotor 208 is farthest out of alignment with receive coil A 202.

In this view, second end 302 has moved farther away from receive coil A 202. As second end 302 moves away from coil A 202, first end 300 moves towards receive coil A 202.

Although the resonant frequency is set by a capacitor associated with each receive coil, the movement of rotor 208 may change the resonant frequency of the receive coil in the illustrative example. In other words, the resonant frequency set for a receive coil from the coil and capacitor changes as rotor 208 moves relative to the receive coil.

Figure 9:
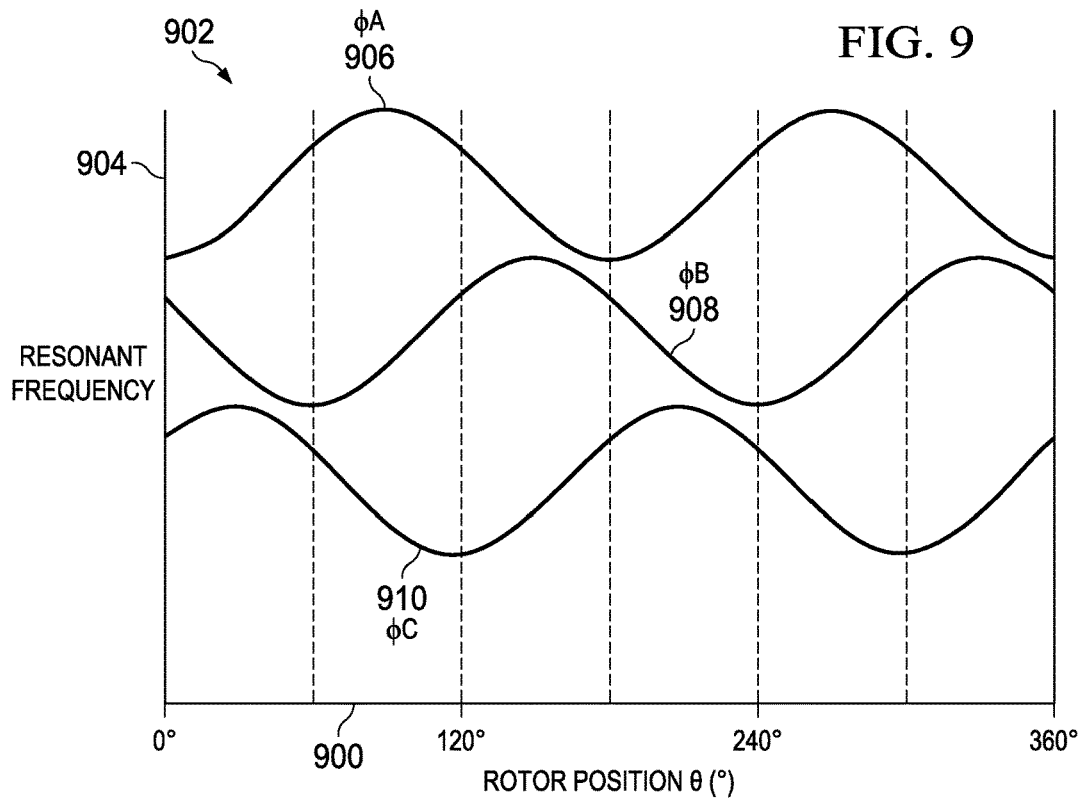
FIG. 9 is an illustration of a graph showing the resonant frequency of receive coils as a rotor moves in accordance with an illustrative embodiment.

With reference next to FIG. 9, an illustration of a graph showing the resonant frequency of receive coils as a rotor moves is depicted in accordance with an illustrative embodiment. As depicted, x-axis 900 in graph 902 shows rotor position θ for rotor 208 in degrees, and y-axis 904 shows the resonant frequency.

In the illustrative example, ΦA is a resonant frequency for receive coil A 202, ΦB is a resonant frequency for receive coil B 204, and ΦC is a resonant frequency for receive coil C 206. In this illustrative example, line 906 represents the resonant frequency (ΦA) for receive coil A 202. Line 908 shows the resonant frequency (ΦB) for receive coil B 204, and line 910 shows the resonant frequency (ΦC) for receive coil C 206.

As can be seen in graph 902, the resonant frequency for each of the receive coils changes as a function of the position of rotor 208. In other words, as rotor 208 changes and moves to different positions, the resonant frequency for each of the receive coils changes.

When rotor 208 has a position θ=90 degrees, the ferromagnetic material in rotor 208 is farthest from receive coil A 202, and the magnetic inductance L of receive coil A 202 has the smallest value. The resonant frequency ΦA in line 906, given by $\omega = (LC)^{-1/2}$, is highest when θ=90 degrees.

As rotor 208 moves toward receive coil A 202, the inductance L of receive coil A 202 increases and the ΦA in line 906 falls. At θ=180 degrees, when rotor 208 is closest to coil A 202, the inductance reaches a maximum value and ΦA reaches a minimum value. As rotor 208 moves past receive coil A 202 towards θ=270 degrees, ΦA in line 906 rises again as shown.

In the illustrative example, receive coil B 204 is connected to a capacitor that is larger than the capacitors for receive coil A 202. As a result, ΦB in line 908 for receive coil B 204 operates at a lower range of resonant frequencies than ΦA in line 906 for receive coil A 202. Because receive coil B 204 is located 120 degrees from receive coil A 202 and rotor 208 has two ends, the rise and fall of ΦB in line 908 lags the ΦA in line 906, by 60 degrees of motion of rotor 208.

As depicted, receive coil C 206 is connected to a capacitor that is larger than the capacitors for receive coil A 202 and receive coil B 204. As a result, ΦC for receive coil C 206 has the lowest range of resonant frequencies of the three receive coils. The rise and fall of ΦC in line 910 lags ΦA in line 906 by 120 degrees.

Figure 10:
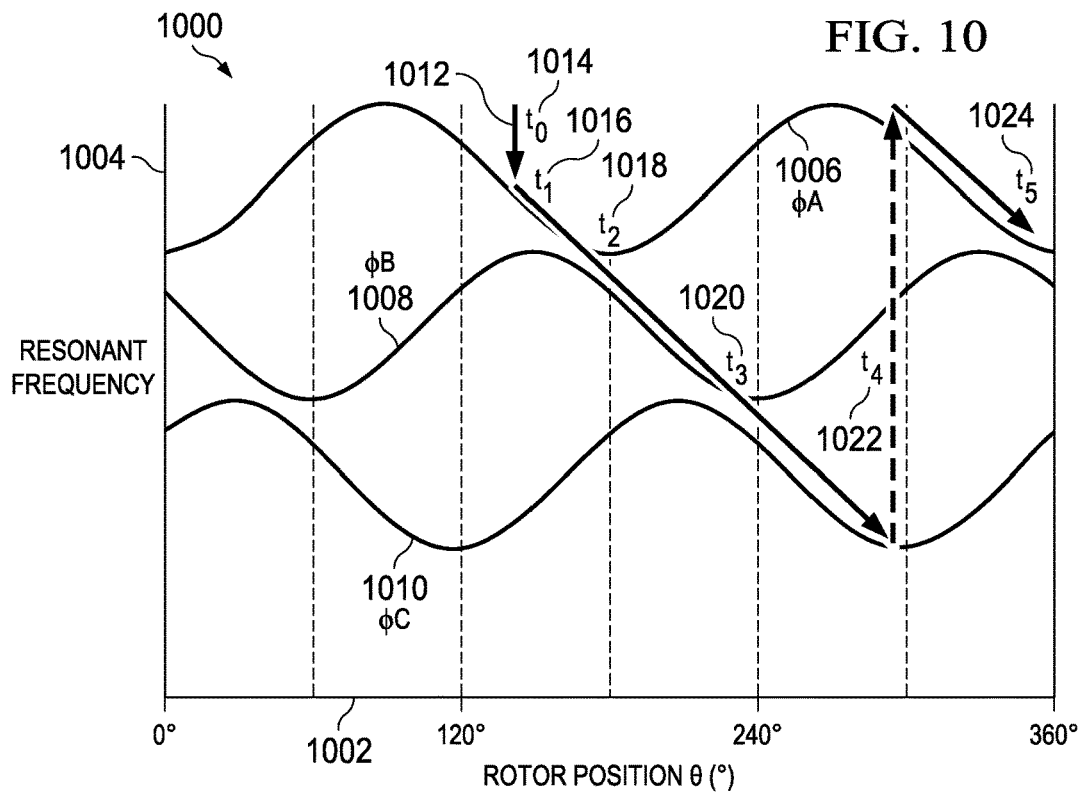
FIG. 10 is an illustration of a graph of resonant frequencies for receive coils in accordance with an illustrative embodiment.

Turning next to FIG. 10, an illustration of a graph of resonant frequencies for receive coils is depicted in accordance with an illustrative embodiment. In this figure, graph 1000 shows resonance frequencies as a function of a rotor position with respect to transmit frequencies. As depicted, x-axis 1002 shows rotor position θ for rotor 208 in degrees, and y-axis 1004 shows the resonant frequency.

In the depicted example, line 1006 represents the resonant frequency (ΦA) for receive coil A 202, line 1008 represents the resonant frequency (ΦB) for receive coil B 204, and line 1010 represents the resonant frequency (ΦC) for receive coil C 206. Line 1012 represents the frequency of the transmit magnetic field generated by a transmit coil at different positions for rotor 208. The frequency of the transmit coil is also referred to as a transmit frequency.

In this figure, the change in the transmit frequency causes rotor 208 to rotate. In this depicted example, the startup cycle is ABC.

When a receive coil is active, the receive coil generates a magnetic field. The receive coil receives energy from the transmitter and converts the energy into an electric current that cause the generation of a receive magnetic field. The receive magnetic field attracts rotor 208 towards the receive coil.

For example, with receive coil A 202, receive coil A 202 activates to generate a receive magnetic field, which causes rotor 208 to be drawn to either θ=0 degrees or θ=180 degrees, whichever is closer.

In another illustrative example, the transmitter does not know the rotor position for rotor 208. The transmitter begins transmitting a transmit magnetic field from the transmit coil with the transmit frequency at the highest possible resonant frequency for receive coil A 202 as shown at time t0 1014 for line 1012.

The transmit frequency then drops as depicted in line 1012. At time t1 1016, the transmit frequency in line 1012 reaches the resonant frequency of coil A 202 corresponding to the current position θ of rotor 208. In graph 1000, θ is about 140 degrees.

At the resonant frequency for receive coil A 202, receive coil A 202 becomes energized and begins to attract rotor 208. As rotor 208 moves closer to receive coil A 202, resonant frequency of receive coil A 202 decreases. As long as the load on phantom motor 200 does not exceed the rotor torque, rotor 208 moves toward receive coil A 202 fast enough to ensure that the resonant frequency of receive coil A 202 decreases at the same rate as the transmit frequency.

At time t2 1018, the transmit frequency in line 1012 reaches the lowest possible resonant frequency for receive coil A 202. At the same time, rotor 208 becomes aligned with coil A 202 with rotor 208 having a position of θ=180 degrees.

The transmit frequency continues to fall and no longer matches the resonant frequency for receive coil A 202. As a result, receive coil A 202 turns off and no longer generates a receive magnetic field. The transmit frequency now matches the resonant frequency for receive coil B 204. Receive coil B 204 becomes active and generates a receive magnetic field that attracts rotor 208. Rotor 208 moves towards θ=240 degrees, which is a position closest to receive coil B 204.

At time t3 1020 in graph 1000, the transmit frequency shown in line 1012 reaches the lowest possible resonant frequency for receive coil B 204. At the same time, rotor 208 becomes aligned with receive coil B 204. Rotor 208 is at θ=240 degrees. The transmit frequency continues to fall as shown in line 1012. Receive coil B 204 turns off and does not generate a magnetic field.

The transmit frequency now matches the resonant frequency for receive coil C 206. As a result, receive coil C 206 becomes active and rotor 208 is attracted to the closest position of that receive coil C 206. Rotor 208 moves towards θ=300 degrees.

At time t4 1022, the transmit frequency in line 1012 reaches the lowest possible resonant frequency for receive coil C 206. At the same time, rotor 208 reaches alignment with coil C 206 with rotor 208 being at θ=300 degrees.

The transmitter switches the transmit frequency to be near the upper end of the resonant frequency range for receive coil A 202 at time t4 1022. Receive coil C 206 turns off and receive coil A 202 becomes active. Rotor 208 is now attracted to the next position of receive coil A 202 which is θ=360 degrees for rotor 208. The cycle then repeats when reaching time t5 1024.

Figure 11:
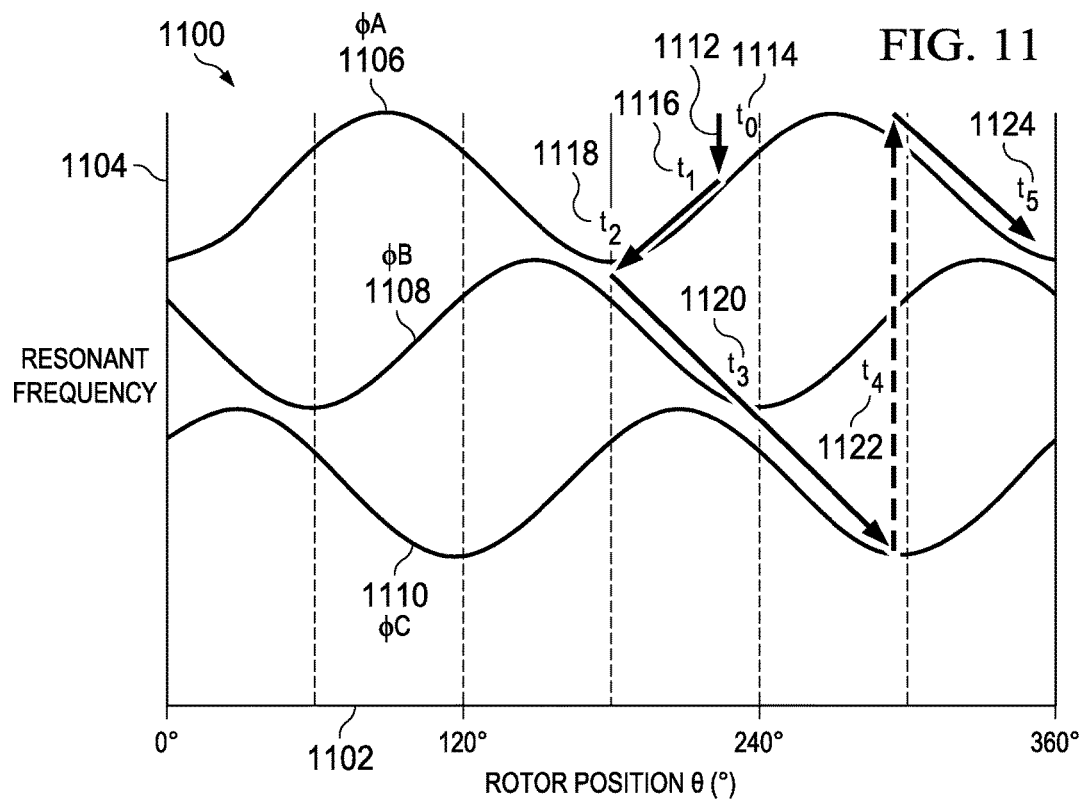
FIG. 11 is an illustration of a graph of resonant frequencies for receive coils in accordance with an illustrative embodiment.

Turing now to FIG. 11, an illustration of a graph of resonant frequencies for receive coils is depicted in accordance with an illustrative embodiment. In this figure, graph 1100 shows resonant frequencies as a function of a rotor position with respect to transmit frequencies. As depicted, x-axis 1102 shows rotor position θ for rotor 208 in degrees, and y-axis 1104 shows the resonant frequency.

In the depicted example, line 1106 represents the resonant frequency (ΦA) for receive coil A 202, line 1108 represents the resonant frequency (ΦB) for receive coil B 204, and line 1110 represents the resonant frequency (ΦC) for receive coil C 206. Line 1112 represents the transmit frequency of the transmit magnetic field generated by a transmit coil at different positions for rotor 208.

Graph 1100 shows a startup cycle when the initial position θ for rotor 208 is slightly forward of the position for receive coil A 202. In this example, the transmit frequency starts at the highest possible resonant frequency for receive coil A 202 at time t0 1114 and decreases as shown in line 1112. At time t1 1116, the transmit frequency matches the current resonant frequency of receive coil A 202.

In this example, rotor 208 has a position θ=220 degrees. As a result, rotor 208 is initially drawn backward towards receive coil A 202 to θ=180 degrees.

At time t2 1118, the transmit frequency as shown in line 1112 reaches the lowest possible resonant frequency for receive coil A 202. Also at time t2 1118, rotor 208 reaches alignment with receive coil A 202 and is at θ=180 degrees.

The transmit frequency in line 1112 continues to fall and no longer matches the resonant frequency of receive coil A 202. As a result, receive coil A 202 turns off and no longer generates a receive magnetic field.

The transmit frequency of the transmit magnetic field now matches the resonant frequency for receive coil B 204. Receive coil B 204 becomes active, and rotor 208 is attracted to the closest position of receive coil B, which is θ=240 degrees for rotor 208. As depicted, θ=240 degrees is a position that is forward from the current position of rotor 208. As a result, rotor 208 stops its initial retrograde movement and begins to move forward in the direction of arrow 600 as shown in FIG. 6. Retrograde movement in this example is movement of rotor 208 in a direction that is opposite to the desired movement of rotor 208.

Subsequently, rotor 208 moves forward, and the transmit frequency continues to cycle from high to low and then jump back to high as shown in FIG. 5. For example, at time t3 1120, receive coil B 204 deactivates and receive coil C 206 activates. At time t4, 1122, the transmit frequency jumps such that receive coil C 206 deactivates and receive coil A 202 activates with the cycle ending at time t5 1124.

Figure 12:
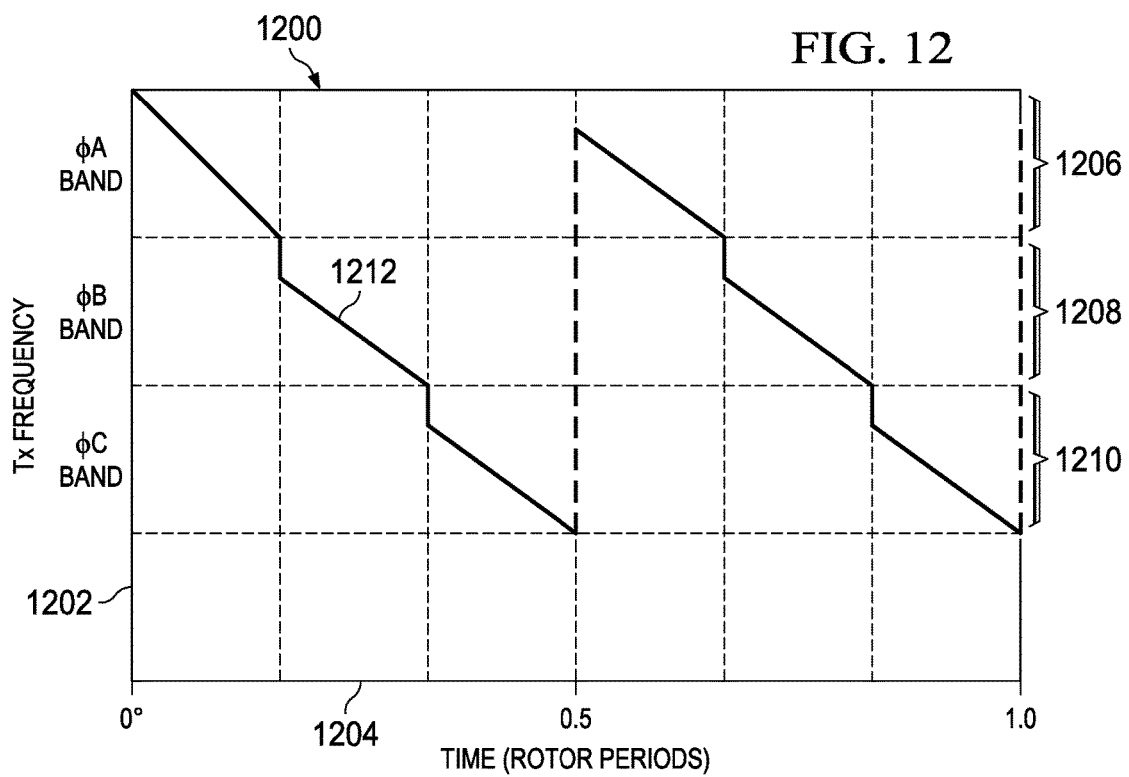
FIG. 12 is an illustration of a graph showing transmission frequency versus time for a transmit magnetic field in accordance with an illustrative embodiment.

Turning now to FIG. 12, an illustration of a graph showing transmission frequency versus time for a transmit magnetic field is depicted in accordance with an illustrative embodiment. As depicted, graph 1200 shows transmission frequencies for a transmit magnetic field generated by a transmit coil.

In this illustrative example, graph 1200 depicts transmit frequency on y-axis 1202 and time on x-axis 1204. The transmit frequency on y-axis 1202 shows the frequencies that cause receive coil A 202, receive coil B 204, and receive coil C 206 to generate magnetic fields. The time on x-axis 1204 shows periods for the turning of a rotor.

As depicted, ΦA band 1206 is a range of frequencies at which receive coil A 202 becomes energized and generates a magnetic field. In this example, ΦB band 1208 is a range of frequencies at which receive coil B 204 becomes energized and generates a magnetic field, and ΦC band 1210 is a range of frequencies at which receive coil C 206 becomes energized and generates a magnetic field.

As depicted, line 1212 shows the frequencies of a magnetic field generated by a transmit coil for rotor 208. The manner in which transmit frequencies change in line 1212 shows jumps in the transmit frequency and is more complex as compared to line 512 for transmit frequencies in FIG. 5. The transmit frequencies shown in line 1212 result in a more efficient operation of phantom motor 200 as compared to the transmit frequencies in line 512 in FIG. 5. Transmit frequencies that are not used to turn rotor 208 or cause reverse motion of rotor 208 are reduced using transmit frequencies following line 1212.

Turning now to FIG. 13, an illustration of a graph showing resonant frequencies for receive coils is depicted in accordance with an illustrative embodiment. In this figure, graph 1300 shows resonant frequencies as a function of a rotor position with respect to transmit frequencies. As depicted, x-axis 1302 shows rotor position θ for rotor 208 in degrees, and y-axis 1304 shows the resonant frequency.

In the depicted example, line 1306 represents the resonant frequency (ΦA) for receive coil A 202, line 1308 represents the resonant frequency (ΦB) for receive coil B 204, and line 1310 represents the resonant frequency (ΦC) for receive coil C 206. Line 1312 represents the transmit frequency of the transmit magnetic field generated by a transmit coil at different positions for rotor 208.

On graph 1300, line 1312 has the same frequency cycle as shown in line 1212 in FIG. 12. In this illustrative example, line 1312 is more discontinuous than line 1012 in FIG. 10.

The cycle of changes in the transmit frequency begins at time t0 1314 with the frequency being above the resonant frequency for receive coil A 202 and decreasing to the resonant frequency of receive coil A 202 at time t1 1316. Line 1312 jumps directly from the minimum resonant frequency for receive coil A 202 with a position of rotor 208 at θ=180 degrees at time t2 1318 to the resonant frequency of receive coil B 204 at the position of rotor 208, where θ=180 degrees.

At time t3 1320, the transmit frequency drops to the resonant frequency for receive coil C 206. At time t4 1322, the transmit frequency increases to the resonant frequency for receive coil A 202 with the cycle being complete at time t5 1324.

With the transmit frequency changes in line 1312, no time is wasted continuing to cause receive coil A 202 to generate a receive magnetic field with transmit frequencies close to the resonant frequency of receive coil A 202. Instead, receive coil B 204 immediately begins attracting rotor 208 to move forward.

Likewise, the transition of the transmit frequencies in line 1312 from resonant frequencies for receive coil B 204 to resonant frequencies for receive coil C 206 at time t3 1320 immediately attracts the rotor to move towards receive coil C 206. The transition of transmit frequencies from resonant frequencies for receive coil C 206 to resonant frequencies for receive coil A 202 at t4 1322 immediately matches the actual resonant frequency of receive coil A 202 and generates forward torque, moving rotor 208 towards receive coil A 202.

In FIG. 14, an illustration of a graph showing transmission frequency versus time for a transmit magnetic field is depicted in accordance with an illustrative embodiment. In this depicted example, graph 1400 shows transmission frequencies for a transmit magnetic field generated by a transmit coil.

In this illustrative example, graph 1400 illustrates transmit frequency on y-axis 1402 and time on x-axis 1404. The transmit frequency on y-axis 1402 shows the frequencies that cause receive coil A 202, receive coil B 204, and receive coil C 206 to generate magnetic fields. The time on x-axis 1404 shows periods for the turning of a rotor.

As depicted, ΦA band 1406 is a range of frequencies at which receive coil A 202 becomes energized and generates a magnetic field. In this example, ΦB band 1408 is a range of frequencies at which receive coil B 204 becomes energized and generates a magnetic field, and ΦC band 1410 is a range of frequencies at which receive coil C 206 becomes energized and generates a magnetic field.

The examples for transmit frequencies described above have been for phantom motor 200 using an ABC phase sequence. In some cases, phantom motor 200 may operate in more than one direction. When phantom motor 200 is a bidirectional motor, a CBA sequence may be used. As depicted, line 1412 shows frequencies of the magnetic field generated by a transmit coil for rotor 208 using a CBA sequence.

As depicted, in the first cycle that is from about 0 to about 0.5 rotor periods, the transmit frequency in line 1412 begins at the highest possible resonant frequency for receive coil A 202. This transmit frequency activates receive coil A 202 if rotor 208 happens to be about 90 degrees out of alignment with receive coil A 202. Subsequent cycles starting at about 0.5 rotor periods and higher begin with the transmit frequency in line 1412 being at the resonant frequency for receive coil A 202 corresponding to rotor 202 being aligned with receive coil B 204.

Figure 15:
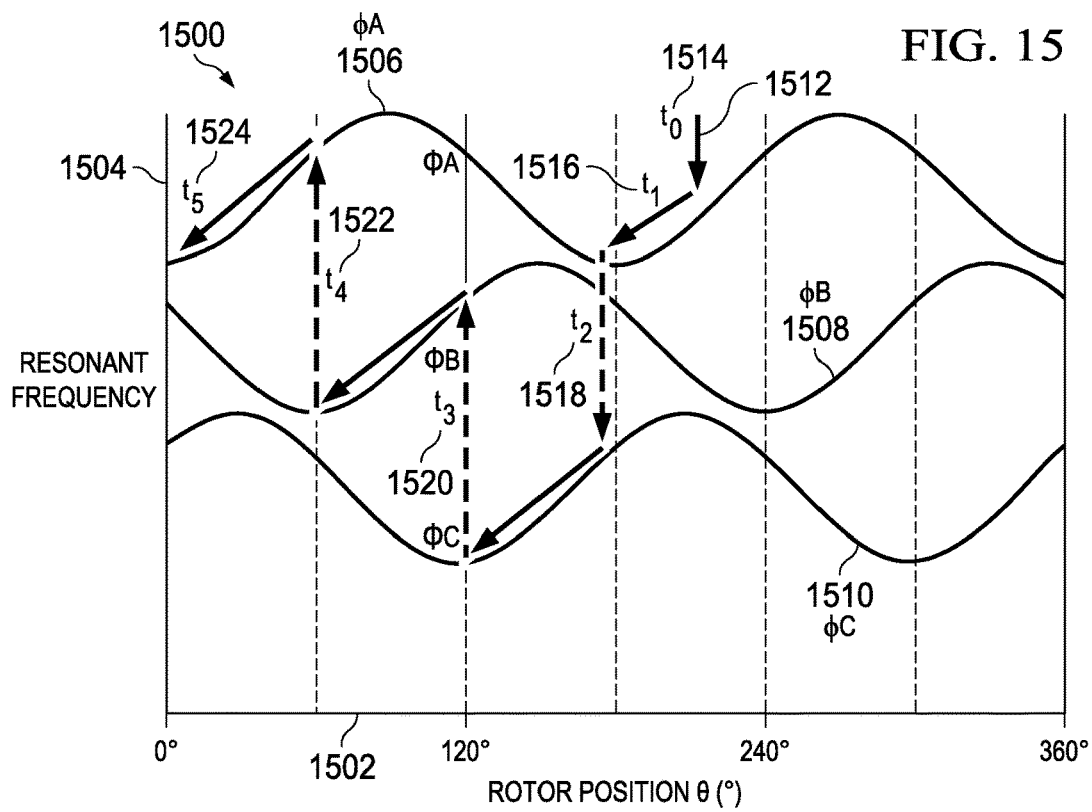
FIG. 15 is an illustration of a graph showing resonant frequencies for receive coils in accordance with an illustrative embodiment.

Turning now to FIG. 15, an illustration of a graph showing resonant frequencies for receive coils is depicted in accordance with an illustrative embodiment. In this figure, graph 1500 shows resonant frequencies as a function of a rotor position with respect to transmit frequencies. As depicted, x-axis 1502 shows rotor position θ for rotor 208 in degrees, and y-axis 1504 shows the resonant frequency.

In the depicted example, line 1506 represents the resonant frequency (ΦA) for receive coil A 202, line 1508 represents the resonant frequency (ΦB) for receive coil B 204, and line 1510 represents the resonant frequency (ΦC) for receive coil C 206. Line 1512 represents the transmit frequency of the transmit magnetic field generated by a transmit coil at different positions for rotor 208.

On graph 1500, line 1512 shows the transmit frequency at different positions for rotor 208 using a CBA cycle for the transmit frequency. Line 1512 shows one cycle for moving rotor 208 in a CBA phase sequence.

In line 1512, the transmit frequency decreases from time t0 1514 to time t1 1516. At time t1 1516, the frequency in line 1512 matches the resonant frequency for receive coil A 202. Rotor 208 is attracted to the nearest position of receive coil A 202, which is θ=180 degrees for rotor 208 in this example.

The transmit frequency continues to decrease as seen in line 1512. At time t2 1518, the transmit frequency in line 1512 reaches the lowest possible resonant frequency for receive coil A 202.

For rotor 208 to continue moving in the direction of the CBA sequence, the transmit frequency in line 1512 jumps to the resonant frequency for receive coil C 206. The highest resonant frequency corresponds to rotor 208 having a position of θ=180 degrees. This transmit frequency is near the upper end of the resonant frequency range for receive coil C 206.

In the illustrative example, receive coil C 206 becomes active. Rotor 208 is attracted to receive coil C 206. Rotor 208 moves towards θ=120 degrees. As depicted in graph 1500, rotor 208 continues to be attracted to the position, θ=120 degrees, as the transmit frequency falls in line 1512 from time t2 1518 to time t3 1520. At time t3 1520, the transmit frequency reaches the lowest possible resonant frequency for receive coil C 206. The transmit frequency in line 1512 jumps to the resonant frequency of receive coil B 204 that corresponds to a position of rotor 208 that is θ=120 degrees. This transmit frequency is near the upper end of the resonant frequency for receive coil B 204 and receive coil B 204 becomes active.

Rotor 208 is attracted to the nearest position of receive coil B, which is a position for rotor 208 that is θ=60 degrees. Rotor 208 continues to be attracted to this position as the transmit frequency falls from time t3 1520 to time t4 1522 as seen in line 1512. At time t4 1522 in line 1512, the transmit frequency reaches the lowest possible resonant frequency for receive coil B 204.

The transmit frequency shown in line 1512 at time t4 1522 jumps to the resonant frequency for receive coil A 202 corresponding to rotor 208 in position θ=60 degrees. This transmit frequency is near the upper end of the resonant frequency for receive coil A 202. Receive coil A 202 becomes active, and rotor 208 is attracted to the nearest position of receive coil A 202 in which θ=0 degrees for rotor 208. Rotor 208 continues to be attracted to this position as the transmit frequency falls from time t4 1522 to time t5 1524 in line 1512. The cycle illustrated in graph 1500 repeats in the CBA phase sequence.

Figure 16:
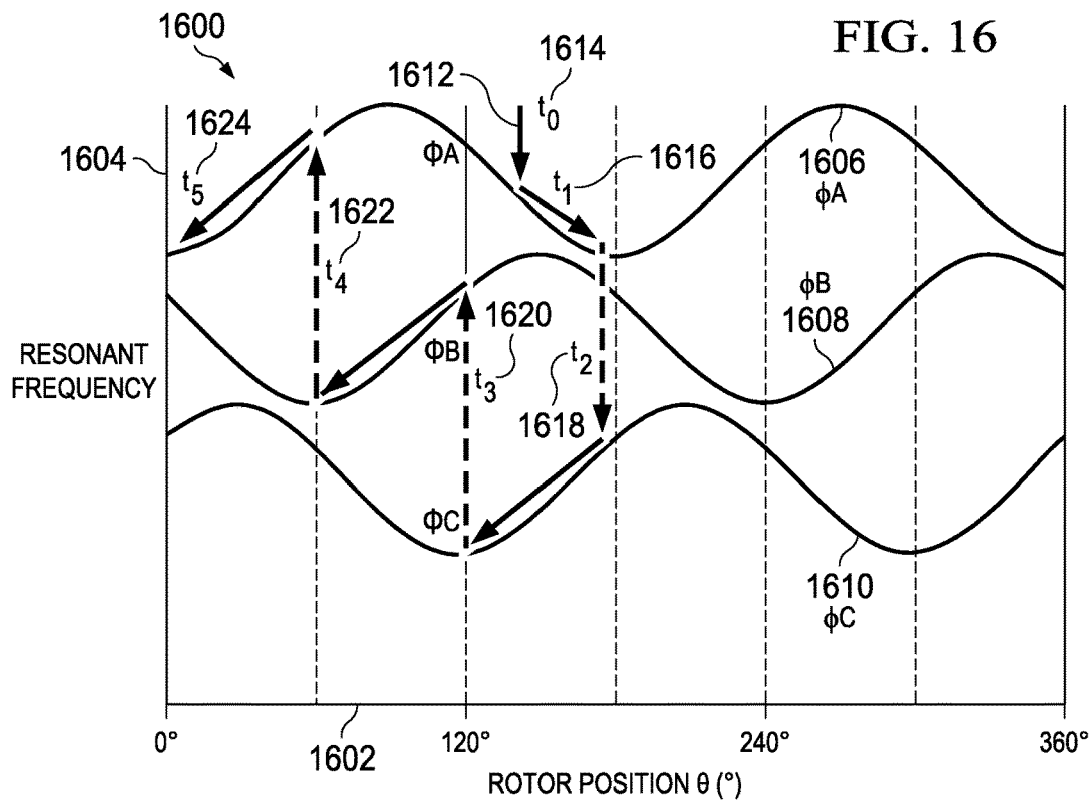
FIG. 16 is an illustration of a graph showing resonant frequencies for receive coils in accordance with an illustrative embodiment.

Turning now to FIG. 16, an illustration of a graph showing resonant frequencies for receive coils is depicted in accordance with an illustrative embodiment. In this figure, graph 1600 shows resonant frequencies as a function of a rotor position with respect to transmit frequencies. As depicted, x-axis 1602 shows rotor position θ for rotor 208 in degrees, and y-axis 1604 shows the resonant frequency.

In the depicted example, line 1606 represents the resonant frequency (ΦA) for receive coil A 202, line 1608 represents the resonant frequency (ΦB) for receive coil B 204, and line 1610 represents the resonant frequency (ΦC) for receive coil C 206. Line 1612 represents the transmit frequency of the transmit magnetic field generated by a transmit coil at different positions for rotor 208.

On graph 1600, line 1612 shows the transmit frequency at different positions for rotor 208 using a CBA cycle for the transmit frequency. Line 1612 in graph 1600 shows a retrograde CBA startup cycle in which rotor 208 moves in a direction opposite to the desired direction of rotation for rotor 208 before moving in the desired direction.

FIG. 16 shows how the same sequence of transmit frequencies gets the motor started when the initial rotor position is slightly ahead of, rather than behind, the first receive coil A 202 position. After an initial retrograde motion during the interval from time t1 to time t2, the rotor continually moves in the CBA direction in this illustrative example.

The transmit frequency drops from a frequency about the resonant frequency for receive coil A 202 at time t0 1614 to the resonant frequency for receive coil A 202 at time t1 1616. The transmit frequency decreases from time t1 1616 to time t2 1618. At time t2 1618, the transmit frequency drops to the resonant frequency for receive coil C 206. From time t2 1618 to time t3 1620, the transmit frequency decreases.

At time t3 1620, the transmit frequency jumps to the resonant frequency of receive coil B 204 and decreases until time t4 1622. At time t4 1622, the transmit frequency jumps to the resonant frequency for receive coil A 202. The transmit frequency decreases until time t5 1624 where the cycle ends.

Figure 17:
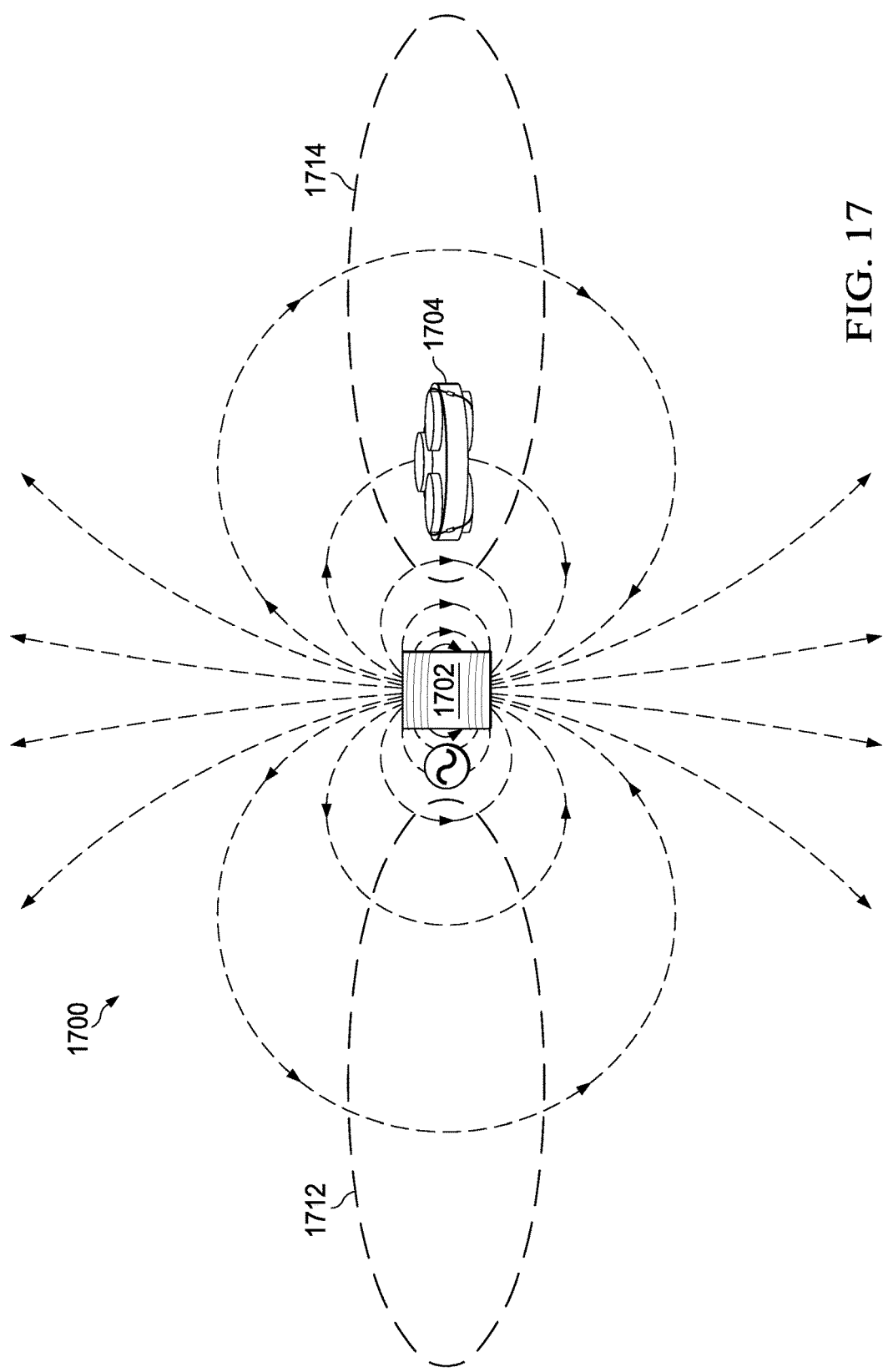
FIG. 17 is an illustration of an electric motor system in accordance with an illustrative embodiment.

With reference now to FIG. 17, an illustration of an electric motor system is depicted in accordance with an illustrative embodiment. As depicted, electric motor system 1700 is an example of an implementation for electric motor system 102 shown in block form in FIG. 1.

As depicted electric motor system 1700 includes transmit coil 1702 and phantom motor 1704. Phantom motor 1704 may be used anywhere within effective region 1712 and effective region 1714. An effective region for phantom motor 1704 is an area where the vectors for transmit magnetic fields generated by transmit coil 1702 provide a desired level for a receive magnetic field generated by the receive coils in response to being exposed to the transmit magnetic fields. For example, effective region 1712 and effective region 1714 may be any area in which phantom motor 1704 rotates with at least one of a desired speed, torque, or other parameters with respect to an operation of phantom motor 1704.

With respect to the upper bound and the lower bound distance, each of effective region 1712 in effective region 1714 to transmit coil 1702 has a lower bound for acceptable torque ripple. In this example, the lower bound is about twice the distance between any two receive coils. In this illustrative example, the upper bound on distance is determined by the magnitude of the magnetic dipole formed by the transmit coil and the minimum magnetic field intensity needed at the receive coils to produce the desired torque. The magnetic field intensity is proportional to the magnitude of the magnetic dipole, inversely proportional to the third power of distance from the transmit coil, and to a coefficient with value between 1 and 2 depending on the angle between the location of the receive coils and the "magnetic equator" of the transmit coil.

The positioning of phantom motor 1704 with respect to transmit coil 1702 is less constrained as compared to currently used phantom motors. Also, the orientation of the receive coils in phantom motor 1704 is less constrained as compared to currently available phantom motors.

Phantom motor 1704 may be used in various applications such that the transmit coil may be located separately from the phantom motor. For example, phantom motor 1704 may be located in a fastener installer robot on the surface of a wing.

Power may be sent to phantom motor 1704 from transmit coil 1702 positioned such that phantom motor 1704 is located within effective region 1712 or effective region 1714. In this manner, cumbersome cables and their support structures may be avoided. Avoiding the need for cables may increase the speed in which fasteners may be installed on a wing.

In one illustrative example, phantom motor 1704 and transmit coil 1702 may move relative to each other. These movements may include changes in distance and orientation between phantom motor 1704 and transmit coil 1702. In this illustrative example, one or more additional transmit coils may be used to generate a magnetic field with the appropriate orientation to provide power to phantom motor 1704.

Figure 18:
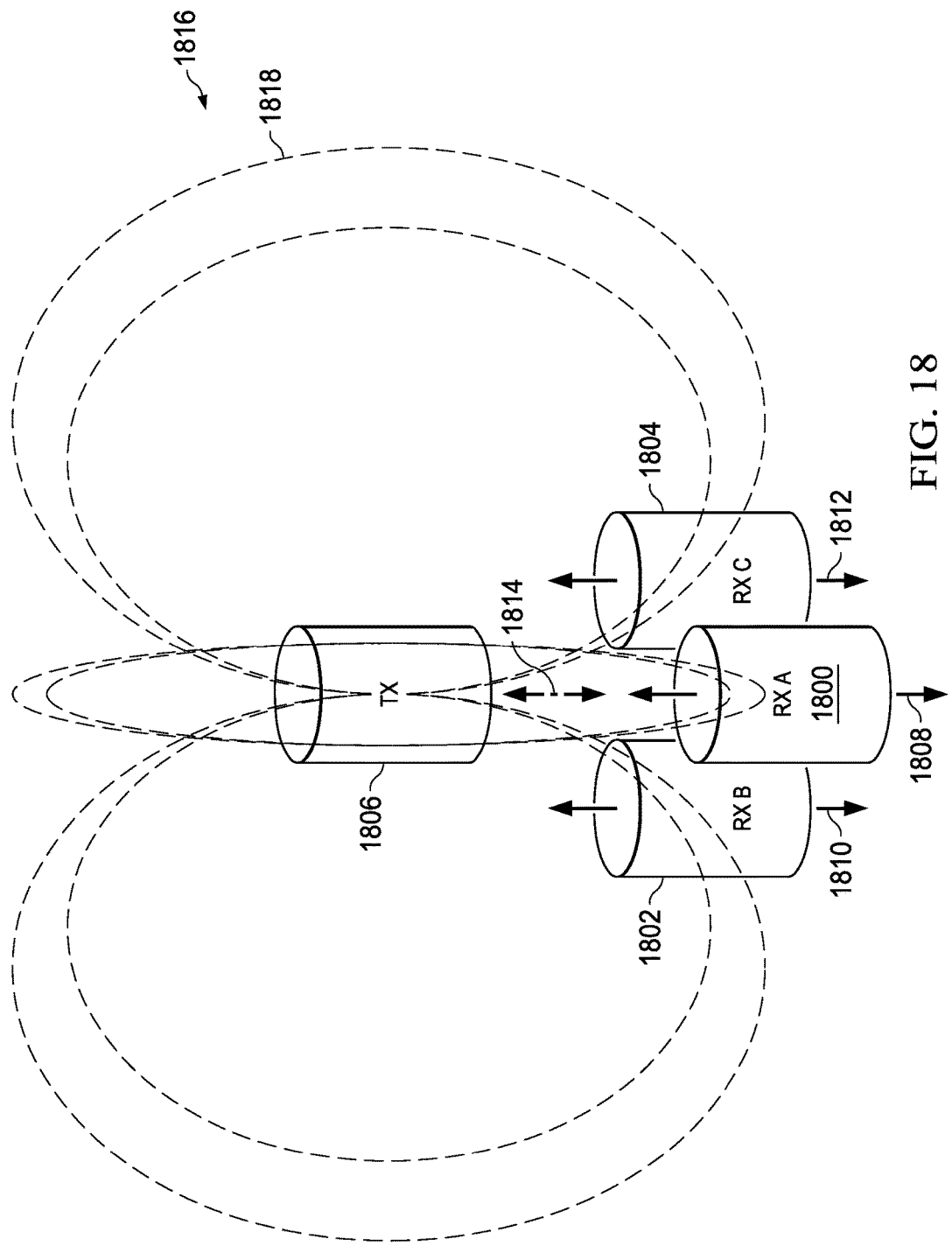
FIG. 18 is an illustration of an initial orientation of receive coils to a transmit coil in accordance with an illustrative embodiment.
Figure 19:
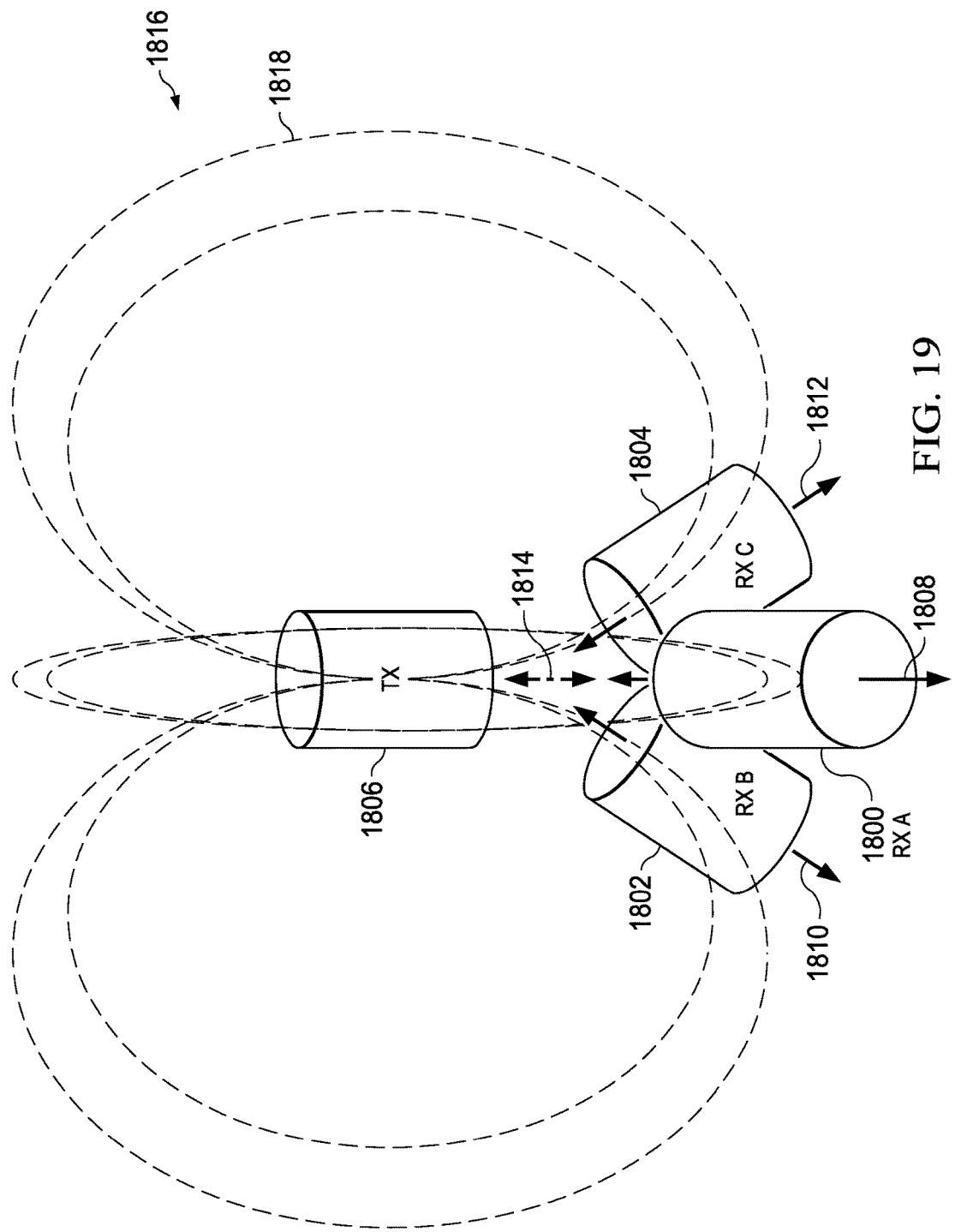
FIG. 19 is an illustration of a tilted orientation for receive coils in accordance with an illustrative embodiment.

With reference now to FIGS. 18 and 19, illustrations of an adjustment for receive coils in a phantom motor are depicted in accordance with an illustrative embodiment. Turning first to FIG. 18, an illustration of an initial orientation of receive coils to a transmit coil is depicted in accordance with an illustrative embodiment.

In this illustrative example, receive coil A 1800, receive coil B 1802, receive coil C 1804, and transmit coil 1806 are shown for an electric motor system. Other components are not shown to avoid obscuring an explanation of the manner in which receive coils may be adjusted in accordance with an illustrative embodiment.

As depicted, receive coil A 1800 has axis 1808, receive coil B 1802 has axis 1810, and receive coil C 1804 has axis 1812. These axes are shown as being substantially parallel to rotor axis 1814. Rotor axis 1814 is an axis about which a group rotor (not shown) rotates.

As shown in this illustrative example, transmit magnetic field 1816 generated by transmit coil 1806 is a magnetic field but does not provide a desired level of power to the receive coils. In this illustrative example, transmit magnetic field 1816 has magnetic field lines 1818. Magnetic field lines 1818 are not substantially parallel to axis 1808, axis 1810, and axis 1812. As a result, the generation of receive magnetic fields by receive coil A 1800, receive coil B 1802, and receive coil C 1804 may not be as efficient as desired.

Turning now to FIG. 19, an illustration of a tilted orientation for receive coils is depicted in accordance with an illustrative embodiment. In this example, receive coil A 1800, receive coil B 1802, and receive coil C 1804 are tilted to provide better alignment with magnetic field lines 1818 in transmit magnetic field 1816 as compared to the original orientation in FIG. 18. In this illustrative example, axis 1808, axis 1810, and axis 1812 are not substantially parallel to rotor axis 1814. However, axis 1808, axis 1810, and axis 1812 are oriented such that they are substantially parallel to magnetic field lines 1818.

For example, the angle of axis 1808, axis 1810, and axis 1812 may approach or may be equal to 90 degrees. With this orientation, the average direction of the coil axes is parallel to rotor axis 1814. The direction may not be parallel when the angle of the axes is equal to 90 degrees. In other words, coil axes, axis 1808, axis 1810, and axis 1812, are symmetric about rotor axis 1814, and each coil axis is coplanar with rotor axis 1814.

In an illustrative example, each of axis 1808, axis 1810, and axis 1812 is substantially parallel to magnetic field lines 1818 in transmit magnetic field 1816 at the location of each receive coil, and the transmit magnetic field 1816 is substantially parallel to rotor axis 1814 at the location of the rotor (not shown).

In another illustrative example, when receive coil A 1800, receive coil B 1802, and receive coil C 1804 are near the "magnetic equator" of transmit coil 1806, or where the distance from transmit coil 1806 to receive coil A 1800, receive coil B 1802, and receive coil C 1804 is greater than about twice the distance between any two receive coils, axis 1808, axis 1810, and axis 1812 are substantially parallel to rotor axis 1814. When receive coil A 1800, receive coil B 1802, and receive coil C 1804 are closer to transmit coil 1806, and especially when receive coil A 1800, receive coil B 1802, and receive coil C 1804 are close to one pole or the other of transmit coil 1806, axis 1808, axis 1810, and axis 1812 may have a greater tilt from the orientation shown in FIG. 18. The average direction of axis 1808, axis 1810, and axis 1812 for the receive coils is still parallel to rotor axis 1814, and the axis of each receive coil is coplanar with rotor axis 1814.

In these illustrative examples, the orientation of receive coil A 1800, receive coil B 1802, and receive coil C 1804 may be changed before, during, or after operation in which the rotor turns. The change in orientation may occur passively or actively.

For example, receive coil A 1800, receive coil B 1802, and receive coil C 1804 may be associated with a tilt adjustment system that allows these receive coils to change the orientation in response to transmit field 1816. In other words, transmit field 1816 provides the force to change the orientation of receive coil A 1800, receive coil B 1802, and receive coil C 1804. In this manner, axis 1808, axis 1810, and axis 1812 may have their orientations changed to provide a more efficient operation of the electric motor.

In another example, the orientation of receive coil A 1800, receive coil B 1802, and receive coil C 1804 may be changed actively by the tilt adjustment system. For example, the tilt adjustment system may include an actuator system that moves the receive coils to change the orientation.

In this manner, the tilt adjustment system may be a tilt adjustment system that changes the orientation of the group of axes for these receive coils based on an amount of divergence of the group of axes from the field lines in the transmit field.

Further, in some illustrative examples, the orientation of axis 1808, axis 1810, and axis 1812 may be different. In other words, axis 1808 may have a different orientation from axis 1810 or axis 1812 depending on how magnetic field lines 1818 extend through receive coil A 1800, receive coil B 1802, and receive coil C 1804 and is aligned with axis 1808, axis 1810, and axis 1812, respectively.

Figure 20:
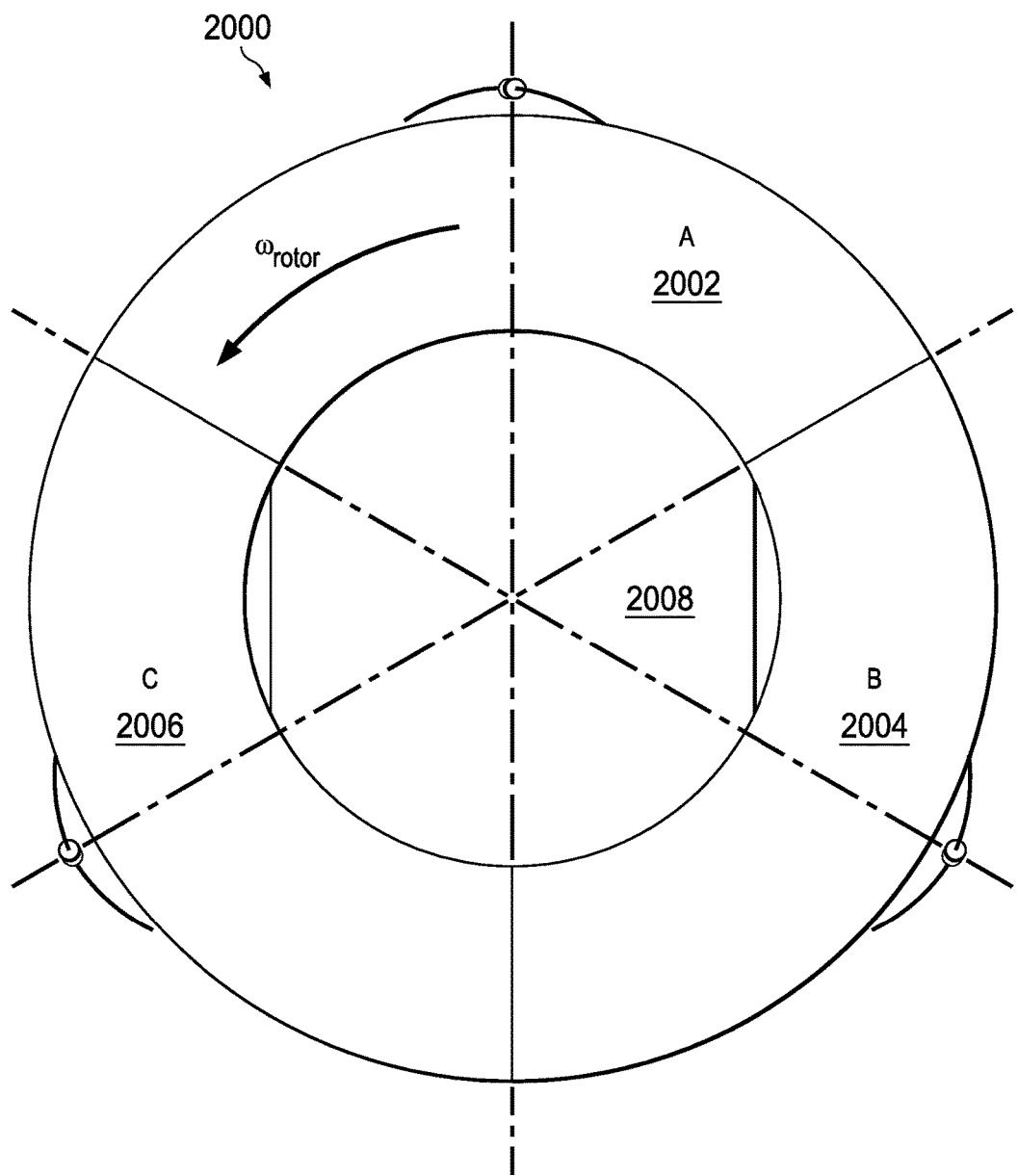
FIG. 20 is an illustration of a phantom motor in accordance with an illustrative embodiment.

Turning next to FIG. 20, an illustration of a phantom motor is depicted in accordance with an illustrative embodiment. As depicted, phantom motor 2000 is an example of one implementation for phantom motor 112 shown in block form in FIG. 1. As depicted, phantom motor 2000 includes receive coil A 2002, receive coil B 2004, and receive coil C 2006. Additionally, phantom motor 2000 also includes rotor 2008.

As depicted, receive coil A 2002, receive coil B 2004, and receive coil C 2006 do not have a cylindrical shape as shown in the other examples. Instead, non-cylindrical coils are used for receive coil A 2002, receive coil B 2004, and receive coil C 2006.

These receive coils are in the form of arcs or sections of a ring. This configuration and other configurations may be used to make the use of space for phantom motor 2000 efficient. Further, the arc shape for receive coil A 2002, receive coil B 2004, and receive coil C 2006 also may span a larger portion of the range of motion for rotor 2008.

In this manner, a more efficient use of materials and energy may occur. Also, this type of shape for receive coil A 2002, receive coil B 2004, and receive coil C 2006 may reduce torque ripple in operation of phantom motor 2000.

Other components are also present but not shown in this illustration. For example, phantom motor 2000 also includes capacitors, a housing, and other components not shown in this illustration. Rotor 2008 has substantially the same size and shape as rotor 208 in FIG. 6. In this example, parts of rotor 2008 are hidden from view by receive coil A 2002, receive coil B 2004, and receive coil C 2006.

The illustration of phantom motors and the graphs illustrating the operation of phantom motors in FIGS. 2-20 are not meant to limit the manner in which other phantom motors may be implemented in accordance with an illustrative embodiment. For example, FIG. 2 and FIG. 4 show receive coils having portions on both sides of rotor 208. In other illustrative examples, these receive coils may be located only on one side of rotor 208. In this manner, a reduced cost for phantom motor 200 may occur. The rotor axle, bearings, or both may be designed to take into account increased twisting torque that may occur from having coils only on one side of rotor 208.

As another example, other numbers of coils may be used other than the three receive coils shown in these figures. For example, four receive coils, six receive coils, or some other number of receive coils may be used.

Also, the controller may change the period of a cycle in which the transmit frequencies change. In this manner, the speed of the motor may be controlled. For example, the controller may control the period of cycles such that a gradual speed increase occurs when starting the electric motor along with a gradual decrease in speed when halting the electric motor. Further, the magnitude of the transmit magnetic field may be selected to change the amount of torque that phantom motor 200 may generate.

The different components shown in FIGS. 2-4, 6-8, and 17-19 may be combined with components in FIG. 1, used with components in FIG. 1, or a combination of the two. Additionally, some of the components in FIGS. 2-4, 6-8, and 17-19 may be illustrative examples of how components shown in block form in FIG. 1 can be implemented as physical structures.

The different illustrative examples describe components that perform actions or operations. In an illustrative embodiment, a component is configured to perform the action or operation described. For example, the component may have a configuration or design that provides the component an ability to perform the action or operation that is described in the illustrative examples as being performable by the component.

Figure 21:
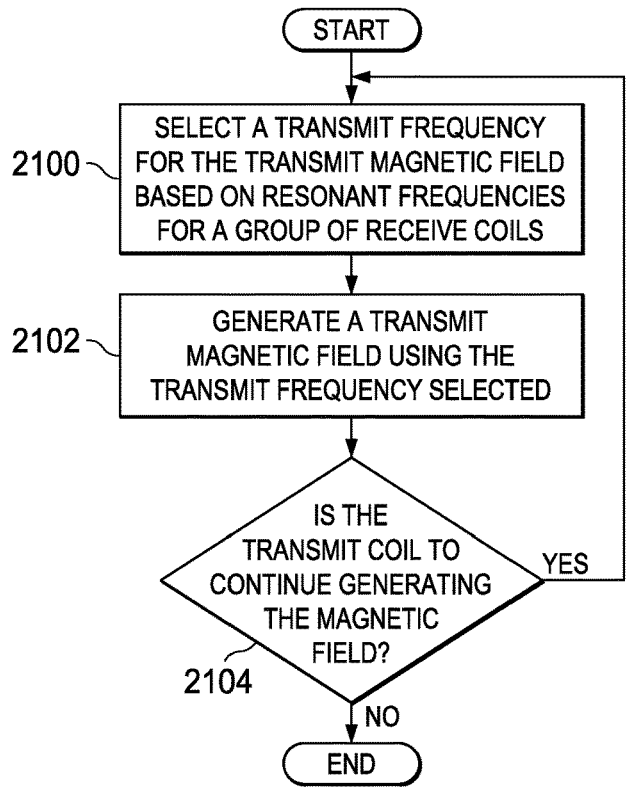
FIG. 21 is an illustration of a flowchart illustrating the generating of a transmit magnetic field in accordance with an illustrative embodiment.

Turning next to FIG. 21, an illustration of a flowchart illustrating the generating of a transmit magnetic field is depicted in accordance with an illustrative embodiment. The process illustrated in FIG. 21 may be implemented in electric motor system environment 100 in FIG. 1. In particular, the different operations illustrated in FIG. 21 may be implemented in electric motor system 102 in FIG. 1.

The process begins by selecting a transmit frequency for the transmit magnetic field based on resonant frequencies for a group of receive coils (operation 2100). In operation 2100, the transmit frequency may be based on the resonant frequencies for the receive coils.

The process then generates a transmit magnetic field using the transmit frequency selected (operation 2102). In operation 2102, the transmit magnetic field with the transmit frequency is generated at a transmit coil positioned relative to the group of receive coils.

A determination is made as to whether the transmit coil is to continue generating the magnetic field (operation 2104). If the transmit coil is to continue generating the transmit magnetic field, the process returns to operation 2100. Otherwise, the process terminates.

In FIG. 21, the transmit frequency may change to encompass all of the resonant frequencies for the receive coil. The time period during which the transmit frequency changes may be referred to as a cycle. Further, the transmit magnetic field provides power to the electric motor in these illustrative examples. As a result, a cable or wire connection to the electric motor is unnecessary.

Figure 22:
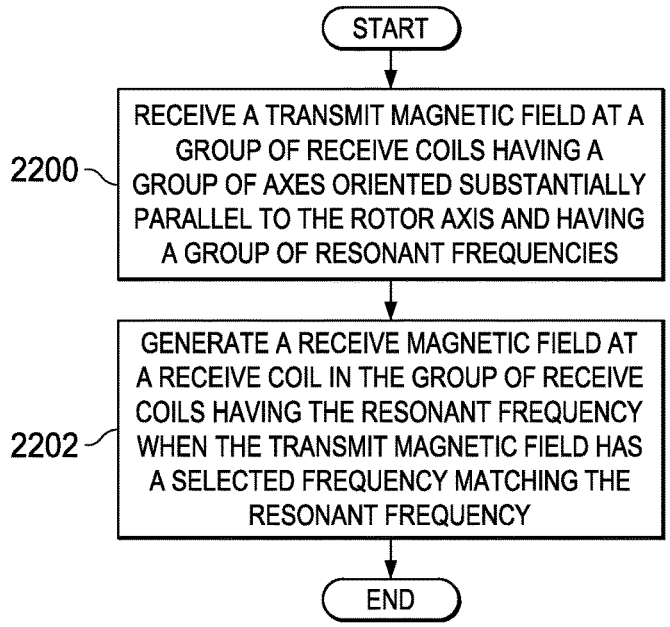
FIG. 22 is an illustration of a flowchart illustrating the operation of an electric motor in accordance with an illustrative embodiment.

Turning next to FIG. 22, an illustration of a flowchart illustrating the operation of an electric motor is depicted in accordance with an illustrative embodiment. The process illustrated in FIG. 22 may be implemented in electric motor system environment 100 shown in block form in FIG. 1. In particular, the different operations illustrated in FIG. 22 may be implemented in electric motor system 102, also shown in block form in FIG. 1.

The process begins by receiving a transmit magnetic field at a group of receive coils having a group of axes oriented substantially parallel to the rotor axis and having a group of resonant frequencies (operation 2200). In operation 2200, a resonant frequency in the group of resonant frequencies is different from other receive coils in the group of receive coils.

The process then generates a receive magnetic field at a receive coil in the group of receive coils having the resonant frequency when the transmit magnetic field has a selected frequency matching the resonant frequency (operation 2202) with the process terminating thereafter. The receive magnetic field attracts a rotor in the electric motor. In one illustrative example, the rotor rotates within a rotor volume and a first portion of the receive coil in the group of coils is located on a first side of the rotor volume and a second portion of the receive coil is located on a second side of the rotor volume that is opposite to the first side of the rotor volume. In another illustrative example, sensors may be used to measure the position of the rotor before starting movement of the rotor.

Figure 23:
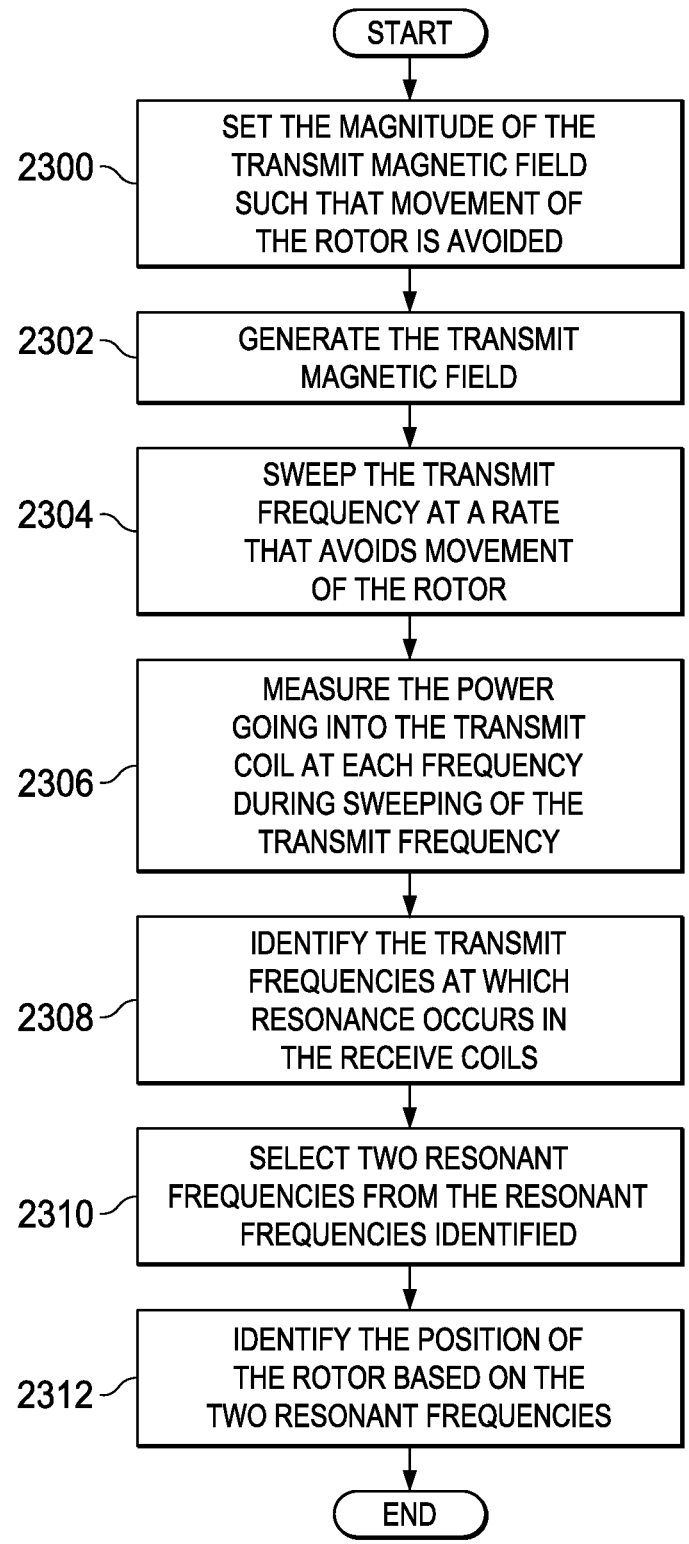
FIG. 23 is an illustration of a flowchart of a process for identifying the position of a rotor and an electric motor in accordance with an illustrative embodiment.

With reference now to FIG. 23, an illustration of a flowchart of a process for identifying the position of a rotor and an electric motor is depicted in accordance with an illustrative embodiment. The process illustrated in FIG. 23 may be implemented in controller 106 shown in block form in FIG. 1. This process may use sensors that sense the amount of current, voltage, or some combination thereof flowing through transmit coil 116 shown in block form in FIG. 1. The process identifies a position of rotor 120 and uses that information in generating transmit magnetic field 118 shown in block form in FIG. 1.

The process begins by setting the magnitude of the transmit magnetic field such that movement of the rotor is avoided (operation 2300). The process then generates the transmit magnetic field (operation 2302). At the selected level, the power sent to the rotor is such that the rotor does not turn in the illustrative example. The process then sweeps the transmit frequency at a rate that avoids movement of the rotor (operation 2304). The sweeping of the transmit frequency is at a rate such that the coils do not respond in any manner that causes the rotor to turn. In other words, this type of changing of the transmit frequency is performed to avoid movement of the rotor.

The sweep of the transmit frequency excites receive coils to some extent. In the illustrative example, resonant frequencies absorb more power from the transmitter as compared to other frequencies.

The process measures the power going into the transmit coil at each frequency during sweeping of the transmit frequency (operation 2306). In operation 2306, the process measures the current, voltage, or both in the transmit coil to identify the power.

The process identifies the transmit frequencies at which resonance occurs in the receive coils (operation 2308). The transmit frequencies identified are the resonance frequencies identified for the receive coils. In one illustrative example, the controller detects three resonant frequencies, one for each phase, but tracks only two of the resonant frequencies. For example, the transmit frequencies tracked may be the highest, the phase for receive coil A 202, and the lowest, the phase for receive coil C 206. The resonant frequencies for receive coil A 202 and receive coil C 206 may both be used to identify the position of rotor 208.

The process selects two resonant frequencies from the resonant frequencies identified (operation 2310). In this illustrative example, the resonant frequency of only one phase does not unambiguously define the position of the rotor, because the same resonant frequency may occur at two positions of the rotor. Of the resonant frequencies identified in operation 2308, the resonant frequencies of any two phases of two transmit frequencies are sufficient to uniquely define the position of the rotor. In other words, more resonant frequencies may be used but are not required to identify the position of the rotor, in this example.

The process then identifies the position of the rotor based on the two resonant frequencies (operation 2312) with the process terminating thereafter. In the illustrative example, the controller may use the two resonant frequencies as input to a lookup table or to a mathematical calculation to estimate the position of the rotor. Based on this estimate, the controller identifies a transmit frequency for use in the transmit magnetic field for the receive coil that should be activated first to move rotor 208 in a desired direction. In this manner, movement in an undesired direction may be reduced or avoided.

Figure 24:
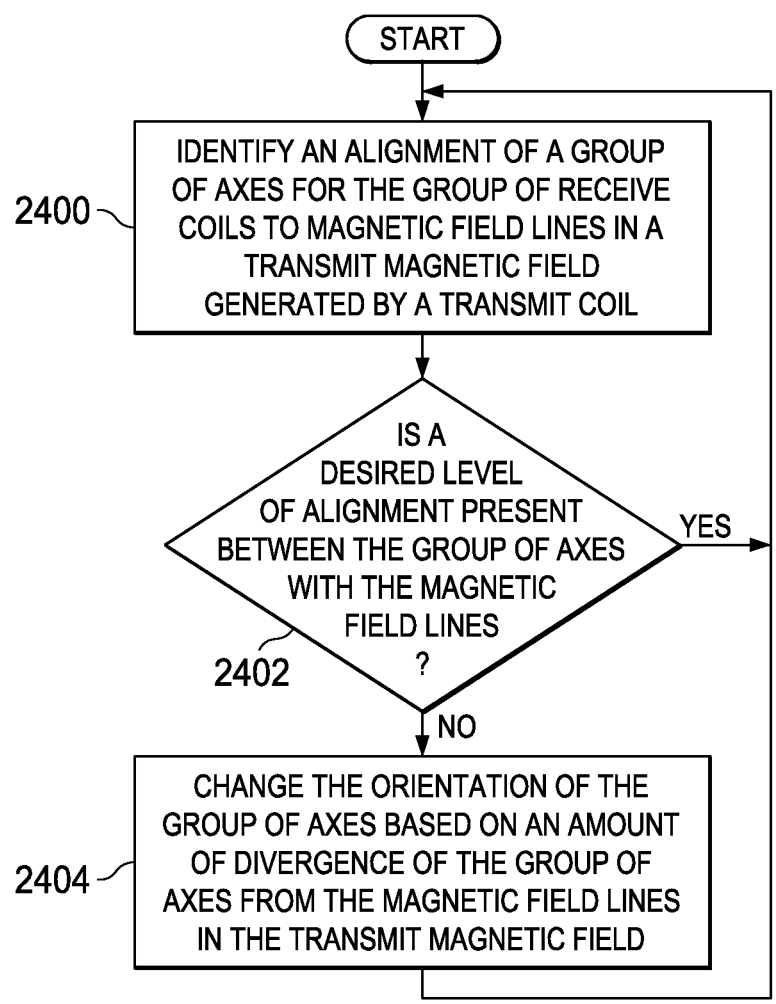
FIG. 24 is an illustration of a flowchart of a process for aligning axes in receiver coils in accordance with an illustrative embodiment.

Turning next to FIG. 24, an illustration of a flowchart of a process for aligning axes in receiver coils is depicted in accordance with an illustrative embodiment. The process illustrated in FIG. 24 may be implemented in electric motor system environment 100 shown in block form in FIG. 1. In particular, the different operations illustrated in FIG. 24 may be implemented in electric motor system 102. Further, the different operations may be performed using tilt adjustment system 160 in FIG. 1.

The process begins by identifying an alignment of a group of axes for the group of receive coils to magnetic field lines in a transmit magnetic field generated by a transmit coil (operation 2400). A determination is made as to whether a desired level of alignment is present between the group of axes with the magnetic field lines (operation 2402). If a desired level of alignment is present, the process returns to operation 2400. Otherwise, if a desired level of alignment is not present, the process changes the orientation of the group of axes based on an amount of divergence of the group of axes from the magnetic field lines in the transmit magnetic field (operation 2404). The process then returns to operation 2400. In operation 2404, the change in the orientation of the group of axes is performed by changing the orientation of the group of receive coils.

The operations illustrated in FIG. 24 are examples of operations performed when an active adjustment of the group of axes is performed. The identification of the magnetic field lines may be performed using a magnetic field sensor or a mathematical model. The change in the orientation of the receive coils may be performed using actuators.

In this illustrative example, the receive coils are to be movably mounted in electric motor system 102 such that the receive coils may be moved to change the orientation of the axes for the receive coils. When the adjustment of the tilt of the axes is performed passively, the receive coils may change the orientation in response to the transmit magnetic field without performing any magnetic field detection adjustment.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for an electric motor system. In particular, the illustrative embodiments provide a method and apparatus for an electric motor system in which the electric motor is powered wirelessly using magnetic fields from a transmitter in the electric motor system. For example, the electric motor system may be a phantom motor system. When using an illustrative example, the weight, cost, or both the weight and cost of the phantom motor system may be less than currently used phantom motor systems. For example, the transmitter uses fewer transmit coils as compared to currently used phantom motor systems. In this manner, cost and weight may both be saved as compared to currently used phantom motor systems.

Further, a phantom motor system implemented in accordance with an illustrative embodiment may provide more flexibility with respect to the configuration or location of the different components. For example, the orientation of the receive coils increases the ease at which the transmit coil may create substantially uniform polarization and intensity within the volume for the three receive coils.

An electric motor in the illustrative examples may be used in a number of different applications with the power being supplied wirelessly from a transmitter that has more flexibility in positioning as compared to currently used electric motors.

An electric motor, in accordance with an illustrative embodiment, such as electric motor 108 in FIG. 1, may be used with bionic limbs. Electric motor 108 also may be used in implants. The reduction in the size, weight, and cost of electric motor 108 as compared to other wireless electric motors may allow for smaller implant sizes, lower maintenance, and new types of implants. The lower maintenance may come from avoiding replacement of batteries or other power sources that may be typically located within the implant. In yet another illustrative example, electric motor 108 may be used in miniature unmanned aerial vehicles (UAVs) without a power source on board those unmanned aerial vehicles. For example, electric motor 108 may be used in a group of miniature unmanned aerial vehicles that may fly indefinitely to obtain data such as weather data or information about the forest.

As another illustrative example, electric motor 108 may be used in nano robots. For example, electric motor 108 may be used as actuators for insecticide robots. These actuators may control joints in these nano robots. In yet another illustrative example, electric motor 108 may be used in robotic arms or other robotic devices in manufacturing products such as aircraft. With electric motor 108, a reduction in wiring in a manufacturing facility may be obtained. Further, by reducing the amount of wiring, the weight on the robotic arm also may be reduced allowing for smaller motors to be used to move the robotic arm and perform operations.

As another example, electric motor 108 may be placed into locations where heat may require more frequent maintenance for motor systems in which the controller is in the same location as the electric motor. With electric motor 108, the transmitter and the controller may be located remotely to electric motor 108 in an environment that is more suitable for longevity of electric circuits. Further, the electronic circuits used in a controller for electric motor 108 may not need to be reduced in size since these components may be located remotely from electric motor 108. As a result, the cost for smaller electronics may be avoided.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An electric motor system comprising:
    a rotor comprised of a magnetic material;
    a plurality of receive coils, wherein each receive coil in the plurality of receive coils has an axis and a resonant frequency that is different from a resonant frequency of each other receive coil in the plurality of receive coils and wherein the plurality of receive coils are positioned with respect to the rotor such that a receive magnetic field generated by each receive coil in the plurality of receive coils attracts the rotor;
    a transmit coil, wherein the transmit coil is positioned with respect to the plurality of receive coils such that magnetic field lines of a transmit magnetic field generated by the transmit coil pass through each receive coil in the plurality of receive coils substantially parallel to the axis of each receive coil in the plurality of receive coils; and
    a controller configured to control the transmit coil to generate the transmit magnetic field at a plurality of different transmit frequencies corresponding to the resonant frequencies of each receive coil in the plurality of receive coils in sequence thereby to cause each receive coil to generate the receive magnetic field in sequence.

2. The apparatus of claim 1, wherein the axis of each receive coil in the plurality of receive coils has an orientation selected from one of substantially parallel to a rotor axis and substantially perpendicular to the rotor axis.

3. The apparatus of claim 1, wherein the rotor is rotatable about a rotor axis.

4. The apparatus of claim 1, wherein the plurality of receive coils are rotatable around a rotor axis.

5. The apparatus of claim 1 further comprising:
    a plurality of capacitors, wherein each capacitor in the plurality of capacitors is connected to one of the receive coils in the plurality of receive coils to set the resonant frequency of each receive coil in the plurality of receive coils.

6. The apparatus of claim 1, wherein the rotor rotates within a rotor volume and a first portion of each receive coil in the plurality of receive coils is located on a first side of the rotor volume and a second portion of each receive coil in the plurality of receive coils is located on a second side of the rotor volume that is opposite to the first side of the rotor volume.

7. The apparatus of claim 1 further comprising:
    a tilt adjustment system that changes an orientation of the axis of each receive coil in the plurality of receive coils based on an amount of divergence of the orientation of the axis of each receive coil in the plurality of receive coils from parallel to the magnetic field lines in the transmit magnetic field.

8. The apparatus of claim 1, wherein the electric motor system is associated with a platform selected from one of a mobile platform, a stationary platform, a land-based structure, an aquatic-based structure, a space-based structure, an aircraft, an unmanned aerial vehicle, an unmanned ground vehicle, a surface ship, a tank, a personnel carrier, a train, a spacecraft, a space station, a satellite, a submarine, an automobile, a power plant, a bridge, a dam, a house, a manufacturing facility, a building, an artificial limb, an artificial organ, an implantable drug pump, a biomedical implant, a robotic arm, and a nano robot.

9. A method for operating an electric motor, the method comprising:
    receiving a transmit magnetic field at a plurality of receive coils wherein each receive coil in the plurality of receive coils has an axis that is oriented substantially parallel to magnetic field lines of the transmit magnetic field, wherein each receive coil in the plurality of receive coils has a resonant frequency that is different from a resonant frequency of each other receive coil in the plurality of receive coils, wherein each receive coil in the plurality of receive coils generates a receive magnetic field in response to receiving the transmit magnetic field at the resonant frequency of the receive coil, and wherein the plurality of receive coils are positioned with respect to a rotor in the electric motor such that the receive magnetic field generated by each receive coil in the plurality of receive coils attracts the rotor in the electric motor; and
    controlling a transmit coil to generate the transmit magnetic field at a plurality of different transmit frequencies corresponding to the resonant frequencies of each receive coil in the plurality of receive coils in sequence thereby to cause each receive coil to generate the receive magnetic field in sequence.

10. The method of claim 9 wherein controlling the transmit coil to generate the transmit magnetic field comprises:
    changing a transmit frequency of the transmit magnetic field over a cycle such that each receive coil in the plurality of receive coils generates a receive magnetic field during the cycle.

11. The method of claim 9, wherein the rotor rotates within a rotor volume and a first portion of each receive coil in the plurality of receive coils is located on a first side of the rotor volume and a second portion of each receive coil in the plurality of receive coils is located on a second side of the rotor volume that is opposite to the first side of the rotor volume.

12. The method of claim 9 further comprising:
changing an orientation of the axis of each receive coil in the plurality of receive coils based on an amount of divergence of the orientation of the axis of each receive coil in the plurality of receive coils from parallel to the magnetic field lines in the transmit magnetic field.

13. The method of claim 9, wherein the rotor is rotatable about a rotor axis.

14. The method of claim 9, wherein the plurality of receive coils are rotatable around a rotor axis.

15. The method of claim 9, wherein the electric motor is associated with a platform selected from one of a mobile platform, a stationary platform, a land-based structure, an aquatic-based structure, a space-based structure, an aircraft, an unmanned aerial vehicle, an unmanned ground vehicle, a surface ship, a tank, a personnel carrier, a train, a spacecraft, a space station, a satellite, a submarine, an automobile, a power plant, a bridge, a dam, a house, a manufacturing facility, a building, an artificial limb, an artificial organ, an implantable drug pump, a biomedical implant, a robotic arm, and a nano robot.

\* \* \* \* \*